US007769525B2

(12) United States Patent
Kakuya et al.

(10) Patent No.: US 7,769,525 B2
(45) Date of Patent: Aug. 3, 2010

(54) APPARATUS AND METHOD FOR CONTROLLING A HOMOGENEOUS CHARGE COMPRESSION-IGNITED INTERNAL-COMBUSTION ENGINE

(75) Inventors: Hiromu Kakuya, Hitachinaka (JP); Kengo Kumano, Hitachi (JP); Shiro Yamaoka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 157 days.

(21) Appl. No.: 12/246,990

(22) Filed: Oct. 7, 2008

(65) Prior Publication Data
US 2009/0259387 A1 Oct. 15, 2009

(30) Foreign Application Priority Data
Nov. 8, 2007 (JP) .............................. 2007-290621

(51) Int. Cl.
*F02D 45/00* (2006.01)
*F02D 41/30* (2006.01)
(52) U.S. Cl. ..................... 701/103; 123/295; 123/305
(58) Field of Classification Search ................. 701/103, 701/102, 105; 123/295, 299, 305
See application file for complete search history.

(56) References Cited

U.S. PATENT DOCUMENTS

| 6,510,834 | B1 * | 1/2003 | Tomita et al. ............... 123/295 |
| 6,651,677 | B2 | 11/2003 | Sukegawa et al. |
| 6,966,185 | B2 | 11/2005 | Shimada et al. |
| 6,966,295 | B2 | 11/2005 | Yamaoka et al. |
| 7,128,048 | B2 | 10/2006 | Yamaoka et al. |
| 7,325,535 | B2 | 2/2008 | Kumano et al. |
| 7,333,885 | B2 | 2/2008 | Kakuya et al. |
| 7,367,310 | B2 | 5/2008 | Kakuya et al. |
| 2007/0062485 | A1 | 3/2007 | Yamaoka et al. |
| 2007/0157604 | A1 | 7/2007 | Kakuya et al. |
| 2008/0147300 | A1 | 6/2008 | Kakuya et al. |

FOREIGN PATENT DOCUMENTS

| EP | 1 710 422 | A2 * | 3/2001 |
| JP | 11-336600 | A | 12/1999 |
| JP | 2005-163624 | A | 6/2005 |
| JP | 2006-336511 | A | 12/2006 |
| JP | 2007-77919 | A | 3/2007 |
| JP | 3964387 | B2 | 8/2007 |
| JP | 2007-247479 | A | 9/2007 |
| JP | 2007-247480 | A | 9/2007 |
| JP | 2008-106782 | A | 5/2008 |
| JP | 2008-151021 | A | 7/2008 |
| JP | 4117799 | B2 | 7/2008 |

* cited by examiner

*Primary Examiner*—Hieu T Vo
(74) *Attorney, Agent, or Firm*—Crowell & Moring LLP

(57) ABSTRACT

In a homogeneous charge compression-ignited internal-combustion engine, based on information regarding the operational state of the engine, a combustion mode switching discriminator selects a homogeneous charge compression-ignited combustion mode if engine operating conditions allow homogeneous charge compression-ignited combustion. If not, the combustion mode switching discriminator selects a spark-ignited combustion mode. Immediately after switching from spark-ignited combustion to homogeneous charge compression-ignited combustion, a combustion mode switching corrector outputs switching correction values for operating quantities for homogeneous charge compression-ignited combustion. The correction values are used to adjust the operating quantities for homogeneous charge compression-ignited combustion, and new operating quantities obtained from the adjustments are output as control quantities from a combustion mode selector.

12 Claims, 15 Drawing Sheets

APPARATUS AND METHOD FOR CONTROLLING A HOMOGENEOUS CHARGE COMPRESSION-IGNITED INTERNAL-COMBUSTION ENGINE

BACKGROUND OF THE INVENTION

1. Field of the Invention

The present invention relates generally to apparatus and methods for controlling a homogeneous charge compression-ignited internal-combustion engine. More particularly, the invention concerns a control apparatus and method for a homogeneous charge compression-ignited internal-combustion engine, suitable for combustion mode switching from spark-ignited combustion to homogeneous charge compression-ignited combustion.

2. Description of the Related Art

Homogeneous charge compression-ignited gasoline engines that achieve compression-ignited combustion by compressing an air-fuel mixture to simultaneously improve both fuel efficiency and gas emissions reduction performance are catching attention as the engines used for automobiles and the like. Compared with the spark-ignited combustion type of engine that ignites and burns the mixture by generating a spark from an ignition plug, the homogeneous charge compression-ignited type of engine reduces fuel consumption by adopting a high compression ratio for enhanced efficiency, reducing a pump loss ratio, and applying rapid combustion for minimum cooling losses, and reduces the concentration of NOx in the gas emissions by burning the mixture at low temperature. The latter engine can therefore improve fuel efficiency and gas emissions reduction at the same time.

Realizing a driver-requested engine torque by executing both spark-ignited combustion and homogeneous charge compression-ignited combustion and switching combustion mode control to one of the two combustion modes, depending on particular conditions, has been proposed during the application of a homogeneous charge compression-ignited engine to an automobile.

Introduction of internal EGR (Exhaust Gas Recirculation) is among the possible methods of implementing homogeneous charge compression-ignited combustion. Spark-ignited combustion uses a relatively rich air-fuel mixture and can therefore be implemented in a region relatively low in internal EGR ratio. Conversely, homogeneous charge compression-ignited combustion based on internal EGR employs a relatively lean air-fuel mixture and can therefore be implemented in a region relatively high in internal EGR ratio. In addition, an unstable combustion region in which both forms of combustion become unstable is present between the above two regions.

Engine parameters that govern combustion are modified when the combustion mode of a homogeneous charge compression-ignited engine is switched from spark-ignited combustion to homogeneous charge compression-ignited combustion. These engine parameters include, for example, the amount of fuel injected from an injector, fuel injection timing in which fuel injection from the injector is started, ignition timing in which the release of a spark from an ignition plug is started, the opening angle of a throttle valve capable of controlling the amount of air flowing into a combustion chamber, the opening/closing control timing or valve lift of an air intake valve or exhaust valve capable of controlling the flow of the mixture into the combustion chamber, and the opening angle of a swirl control valve capable of controlling the flow intensity of the mixture within the combustion chamber. Since an actuator for controlling the engine parameters has definite response characteristics, there have been problems in that during mode switching, misfiring or fluctuations in torque are caused by the occurrence of an in-cylinder state substantially equivalent to that of the engine in the unstable combustion region mentioned above.

Among known methods for solving these problems is a method in which a period for setting up the foregoing engine parameters as transient ones is provided during mode switching from spark-ignited combustion to homogeneous charge compression-ignited combustion to provide against the unstable combustion region. JP-A-11-336600, for example, discloses such a method. According to JP-A-11-336600, combustion is stabilized in the transient parameter setup period by advancing ignition timing to reduce torque fluctuations at a mode switching operation.

SUMMARY OF THE INVENTION

The method described in JP-A-11-336600 allows the suppression of torque fluctuations during mode switching from spark-ignited combustion to homogeneous charge compression-ignited combustion. However, JP-A-11-336600 pays no consideration to the suppression of knocking during combustion mode switching, and there has been the problem that combustion noise during combustion mode switching cannot be reduced by using the corresponding method.

The reason for this is discussed below. It is known that a combustion temperature difference of several hundred degrees in Kelvin [K] exists between spark-ignited combustion and homogeneous charge compression-ignited combustion, and hence that the spark-ignited combustion temperature becomes high. Because of the combustion temperature difference, the in-cylinder wall surface temperature is maintained at a high level immediately after mode switching from spark-ignited combustion to homogeneous charge compression-ignited combustion. This high in-cylinder temperature will make knocking easily occur near the wall surface of the combustion chamber if the ignition timing is advanced.

In addition, during the transition phase of mode switching, when pressure is increased by the execution of spark-ignited combustion, the mixture remaining unburnt in the cylinder may induce combined combustion that leads to self-ignition. Since combined combustion is the combustion in which a part of the mixture leads to self-ignition at the same time, this combustion has a lower combustion temperature than spark-ignited combustion. Because of this combustion temperature difference, immediately after mode switching from spark-ignited combustion to combined combustion, the temperature of the exhaust gases introduced into the cylinder during internal EGR in the next cycle becomes high, compared with the temperature of the exhaust gases existing during combined combustion under the steady state of the engine. Furthermore, increases in the temperature of internal EGR reduce the density thereof. Accordingly, the execution timing of self-ignition is advanced by the acceleration of chemical reactions, associated with increases in cylinder internal temperature due to internal EGR, and by an increase in combustion rate (in comparison with the combined combustion rate during stable operation under the steady state) due to the shortage of the internal EGR density. The advanced execution timing of self-ignition causes abrupt steep in-cylinder pressure increases, resulting in temporarily increased combustion noise.

Although the advancement of the self-ignition timing is caused primarily by the increase in exhaust gas temperature due to the combustion temperature difference, the influence of the in-cylinder wall surface temperature increase due to the combustion temperature difference is also among the causes of the advancement.

During homogeneous charge compression-ignited combustion that follows combined combustion, the execution timing of self-ignition is also advanced by the acceleration of chemical reactions, associated with the increases in internal EGR temperature (in-cylinder temperature) due to combustion temperature difference, and by the increase in combustion rate due to the shortage of the internal EGR density in comparison with the homogeneous charge compression-ignited combustion rate during steady operation. The advancement of the self-ignition timing abruptly increases the in-cylinder pressure, hence increasing combustion noise.

As described above, there has been the problem that transient changes in cylinder internal state, associated with combustion mode switching, increases combustion noise.

The maximum increase rate of pressure is used as an index that defines self-ignited combustion noise. The above required value is usually set to range from 0.3 to 0.4 [Mpa/deg.] or less. During the self-ignited combustion at the above value or less, the mixture in the cylinder starts to burn after multi-point simultaneous self-ignition in the combustion chamber. If the above value is exceeded, a sudden increase in pressure will increase combustion noise, thus increasing the combustion noise released from the engine. In addition, at an even higher increase rate of pressure, abnormal combustion (i.e., knocking) near the wall surface of the combustion chamber may occur in irregular timing during the increase of the in-cylinder pressure.

An object of the present invention is to provide a apparatus and method for controlling a homogeneous charge compression-ignited internal-combustion engine, the apparatus and method being adapted to reduce combustion noise, as well as fluctuations in torque, during combustion mode switching from spark-ignited combustion to homogeneous charge compression-ignited combustion.

In order to fulfill the above object, the present invention provides, as an aspect thereof, a control apparatus used for a homogeneous charge compression-ignited internal-combustion engine which includes an injector for injecting a fuel into a combustion chamber, an igniter for igniting the fuel that has been injected into the combustion chamber, an air intake valve provided at an air intake side of a cylinder constituted as part of the combustion chamber, the intake valve being adapted to control operational timing of the valve itself, an exhaust valve provided at an exhaust side of the cylinder and adapted to control operational timing of the exhaust valve itself, a throttle valve adapted to control the amount of air flowing into the combustion chamber, and a swirl control valve adapted to control the flow of the air into the combustion chamber, the control apparatus comprising: a spark-ignited combustion mode in which the fuel injected from the injector is ignited and burned by the igniter in order to operate the internal-combustion engine; a homogeneous charge compression-ignited combustion mode in which the fuel injected from the injector is burned by utilizing an internal pressure increase of the cylinder in order to operate the internal-combustion engine; and means for controlling the injection of the fuel from the injector, ignition by the igniter, opening and closing of the intake valve, opening and closing of the exhaust valve, opening and closing of the throttle valve, and an opening angle of the swirl control valve, the control means being adapted to switch engine operation from the spark-ignited combustion mode to the homogeneous charge compression-ignited combustion mode according to information on an operational state of the engine; wherein, upon switching from the spark-ignited combustion mode to the homogeneous charge compression-ignited combustion mode, the control means causes execution timing of ignition by the igniter to advance in the spark-ignited combustion mode, and for reduced maximum increase rate of pressure inside the combustion chamber, adjusts at least one of control quantities including the fuel injection from the injector, ignition by the igniter, the opening and closing of the intake valve, the opening and closing of the exhaust valve, the opening and closing of the throttle valve, and the opening angle of the swirl control valve.

In order to fulfill the above object, the present invention provides, as another aspect thereof, a control method used for a homogeneous charge compression-ignited internal-combustion engine which includes an injector for injecting a fuel into a combustion chamber, an igniter for igniting the fuel that has been injected into the combustion chamber, an air intake valve provided at an air intake side of a cylinder constituted as part of the combustion chamber, the intake valve being adapted to control operational timing of the valve itself, an exhaust valve provided at an exhaust side of the cylinder and adapted to control operational timing of the exhaust valve itself, a throttle valve adapted to control the amount of air flowing into the combustion chamber, and a swirl control valve adapted to control the flow of the air into the combustion chamber, the control method comprising: a spark-ignited combustion mode in which the fuel injected from the injector is ignited and burned by the igniter in order to operate the internal-combustion engine; and a homogeneous charge compression-ignited combustion mode in which the fuel injected from the injector is burned by utilizing an internal pressure increase of the cylinder in order to operate the internal-combustion engine; the control method being adapted to control the injection of the fuel from the injector, ignition by the igniter, opening and closing of the intake valve, opening and closing of the exhaust valve, opening and closing of the throttle valve, and an opening angle of the swirl control valve, the control method being further adapted to switch engine operation from the spark-ignited combustion mode to the homogeneous charge compression-ignited combustion mode according to information on an operational state of the engine; wherein, upon switching from the spark-ignited combustion mode to the homogeneous charge compression-ignited combustion mode, execution timing of the ignition by the igniter is advanced in the spark-ignited combustion mode, and at least one of control quantities on the fuel injection from the injector, on the ignition by the igniter, on the opening and closing of the intake valve, on the opening and closing of the exhaust valve, on the opening and closing of the throttle valve, and on the opening angle of the swirl control valve, is adjusted for reduced maximum increase rate of pressure inside the combustion chamber.

The above configuration or method allows combustion noise as well as torque fluctuations to be reduced during switching from spark-ignited combustion to homogeneous charge compression-ignited combustion.

According to the present invention, smooth and silent switching of the combustion mode can be realized by reducing torque fluctuations and combustion noise during switching from spark-ignited combustion to homogeneous charge compression-ignited combustion.

DESCRIPTION OF THE PREFERRED EMBODIMENTS

Hereunder, a configuration and operation of a control apparatus for controlling a homogeneous charge compression-ignited internal-combustion engine according to a first embodiment of the present invention will be described using FIGS. 1 to 15.

Figure 1:
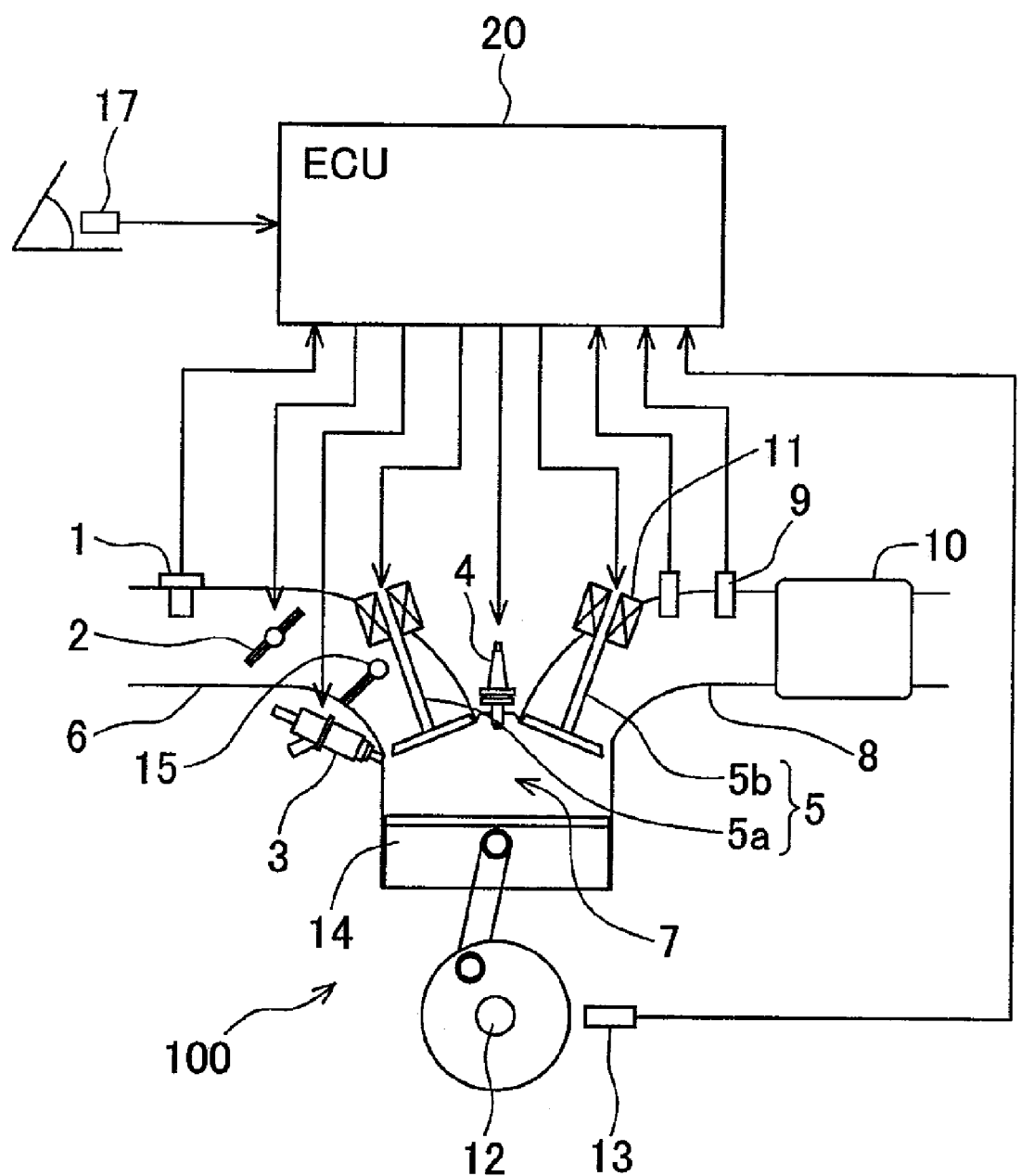
FIG. 1 is a system block diagram illustrating a configuration of an automotive gasoline engine system to which is applied a control apparatus that controls a homogeneous charge compression-ignited internal-combustion engine according to a first embodiment of the present invention.

A configuration of an engine system in which the control apparatus for controlling a homogeneous charge compression-ignited internal-combustion engine according to the present embodiment is applied to an automotive gasoline engine will be first described using FIG. 1.

FIG. 1 is a system block diagram illustrating the configuration of the automotive gasoline engine system to which is applied the control apparatus that controls a homogeneous charge compression-ignited internal-combustion engine according to the first embodiment of the present invention.

The engine 100 is an automotive gasoline engine that executes spark-ignited combustion and homogeneous charge compression-ignited combustion. The engine 100 has an airflow sensor 1 for measuring an amount of intake air, and an electronically controlled throttle valve 2 for controlling the flow rate of the intake air. The airflow sensor 1 and the throttle valve 2 are provided at appropriate positions in an air intake pipe 6. The engine 100 also has an injector 3 for injecting a fuel into a combustion chamber surrounded by a cylinder 7 and a piston 14, and an ignition plug 4 for supplying ignition energy. The injector 3 and the ignition plug 4 are provided at appropriate positions on the cylinder 7. A variable valve 5 including an intake valve 5a for controlling a flow of an intake air into the cylinder, and an exhaust valve 5b for controlling a flow of exhaust gases released from the cylinder, is also provided at an appropriate position on the cylinder 7. An internal EGR rate of the cylinder is controlled by control of the variable valve 5.

Furthermore, a three-way catalyst 10 for cleaning the exhaust gases, an air-fuel ratio sensor 9 that is one form of air-fuel ratio detector and detects an air-fuel ratio of the exhaust gases at an upstream side of the catalyst 10, and an exhaust gas temperature sensor 11 that is one form of exhaust gas temperature detector and detects a temperature of the exhaust gases at the upstream side of the catalyst 10 are provided at appropriate positions on the exhaust pipe 8. A crank angle sensor 13 for calculating a rotational angle is equipped on a crankshaft 12. The engine 100 further includes a swirl control valve 15 adapted to control a flow intensity level of an air-fuel mixture formed in the combustion chamber. Moreover, the engine 100 includes an accelerator angle sensor 17 that detects an accelerator angle.

Signals from the airflow sensor 1, the air-fuel ratio sensor 9, the exhaust gas temperature sensor 11, and the crank angle sensor 13, are sent to an engine control unit (ECU) 20. A signal from the accelerator angle sensor 17 is also sent to the ECU 20. The accelerator angle sensor 17 detects the amount of accelerator pedal stepping-on, that is, the accelerator angle. The ECU 20 computes a requested torque from the output signal of the accelerator angle sensor 17. That is to say, the accelerator angle sensor 17 is used as a requested-torque detection sensor to detect the requested engine torque. The ECU 20 also computes the engine speed from the output signal of the crank angle sensor 13. The ECU 20 optimally computes major operating quantities of the engine, such as the flow rate of air, the quantity of fuel injection, and ignition timing, in accordance with information on an operational state of the engine, the information being obtained from the output signals of each sensor described above.

The quantity of fuel injection that the ECU 20 has computed is converted into a valve-opening pulse signal and then sent to the injector 3. In addition, an ignition plug driving signal is sent to the ignition plug 4 so that the fuel is ignited in the ignition timing that the ECU 20 has computed. Furthermore, the throttle angle that the ECU 20 has computed is sent as a throttle valve driving signal to the electronically controlled throttle valve 2. Moreover, the operating quantity of the variable valve 5 that the ECU 20 has computed is sent as a variable valve driving signal to the variable valve 5. Besides, an opening angle of the swirl control valve that the ECU 20 has computed is sent as a swirl control valve driving signal to the swirl control valve 15.

Next, the configuration of the control apparatus for controlling a homogeneous charge compression-ignited internal-combustion engine according to the first embodiment of the present invention will be described using FIG. 2.

Figure 2:
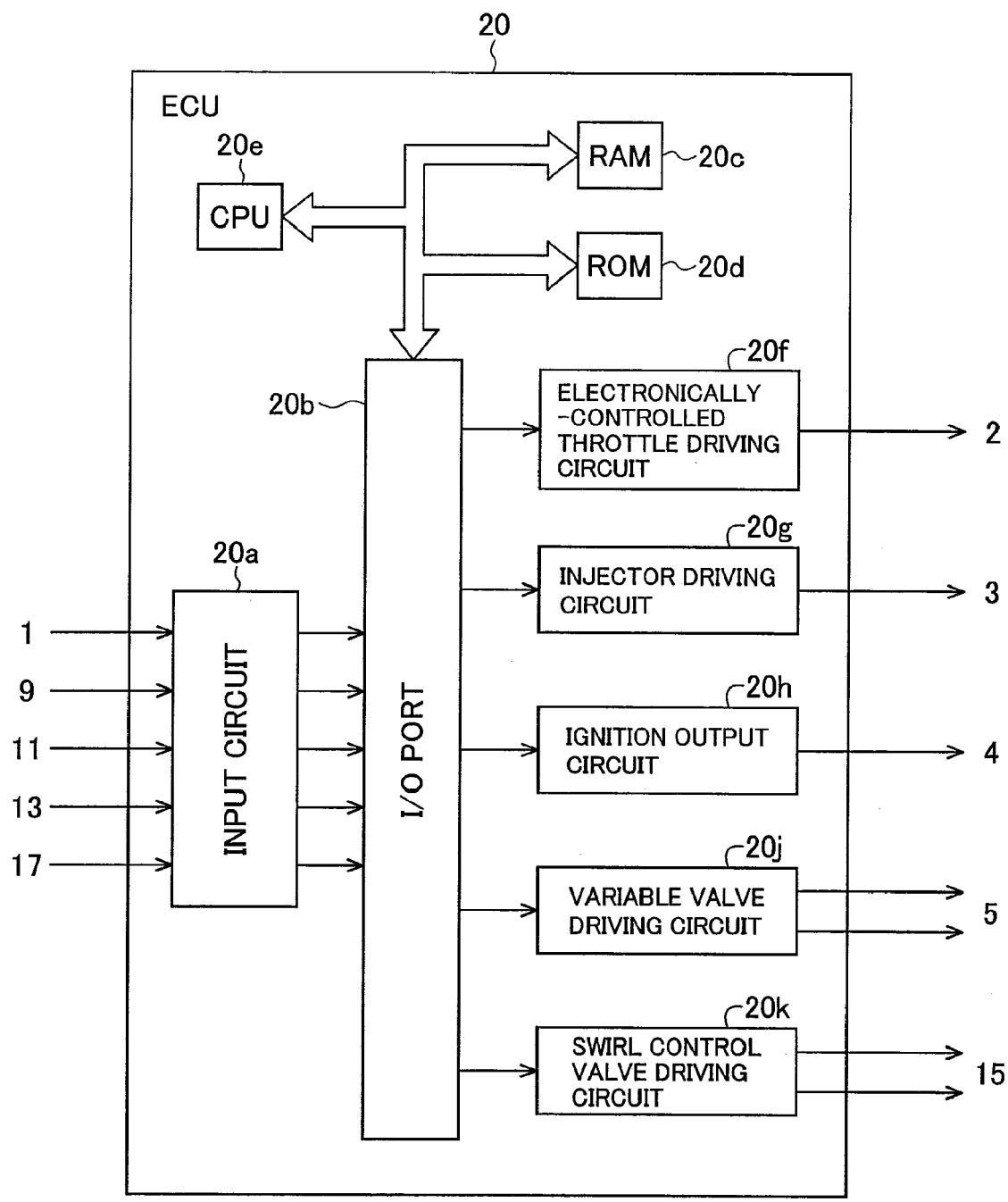
FIG. 2 is a system block diagram illustrating a configuration of the control apparatus for controlling a homogeneous charge compression-ignited internal-combustion engine according to the first embodiment of the present invention.

FIG. 2 is a system block diagram illustrating the configuration of the control apparatus for controlling a homogeneous charge compression-ignited internal-combustion engine according to the present embodiment.

Output signals from the airflow sensor 1, the air-fuel ratio sensor 9, the exhaust gas temperature sensor 11, and the crank angle sensor 13, are input to an input circuit 20*a* of the ECU 20. Input signals, however, are not limited to these kinds of signals. Input signals from each sensor are sent to multiple input ports within input/output ports 20*b*. The signal values that have been sent to the input ports 20*b* are stored into a RAM 20*c* and then subjected to arithmetic processing in a CPU 20*e*. A control program with arithmetic processing details descriptively defined therein is prestored within a ROM 20*d*.

Data indicating those operating quantities of actuators which have been computed in accordance with the control program is stored into the RAM 20*c*, then sent to multiple output ports within the input/output ports 20*b*, and transferred to each actuator via various driving circuits. The kinds of driving circuits used in the present embodiment include an electronically controlled throttle driving circuit 20*f*, an injector driving circuit 20*g*, an ignition output circuit 20*h*, a variable valve driving circuit 20*j*, and a swirl control valve driving circuit 20*k*. These driving circuits control the electronically controlled throttle valve 2, the injector 3, the ignition plug 4, the variable valve 5, and the swirl control valve 15, respectively. Although the control apparatus in the present embodiment has the above driving circuit arrangement in the ECU 20, this arrangement is not restrictive and the apparatus may have either one or more of the above driving circuits in the ECU 20.

Next, a combustion mode switching circuit composition of the control apparatus for controlling a homogeneous charge compression-ignited internal-combustion engine according to the first embodiment of the present invention will be described using FIG. 3.

Figure 3:
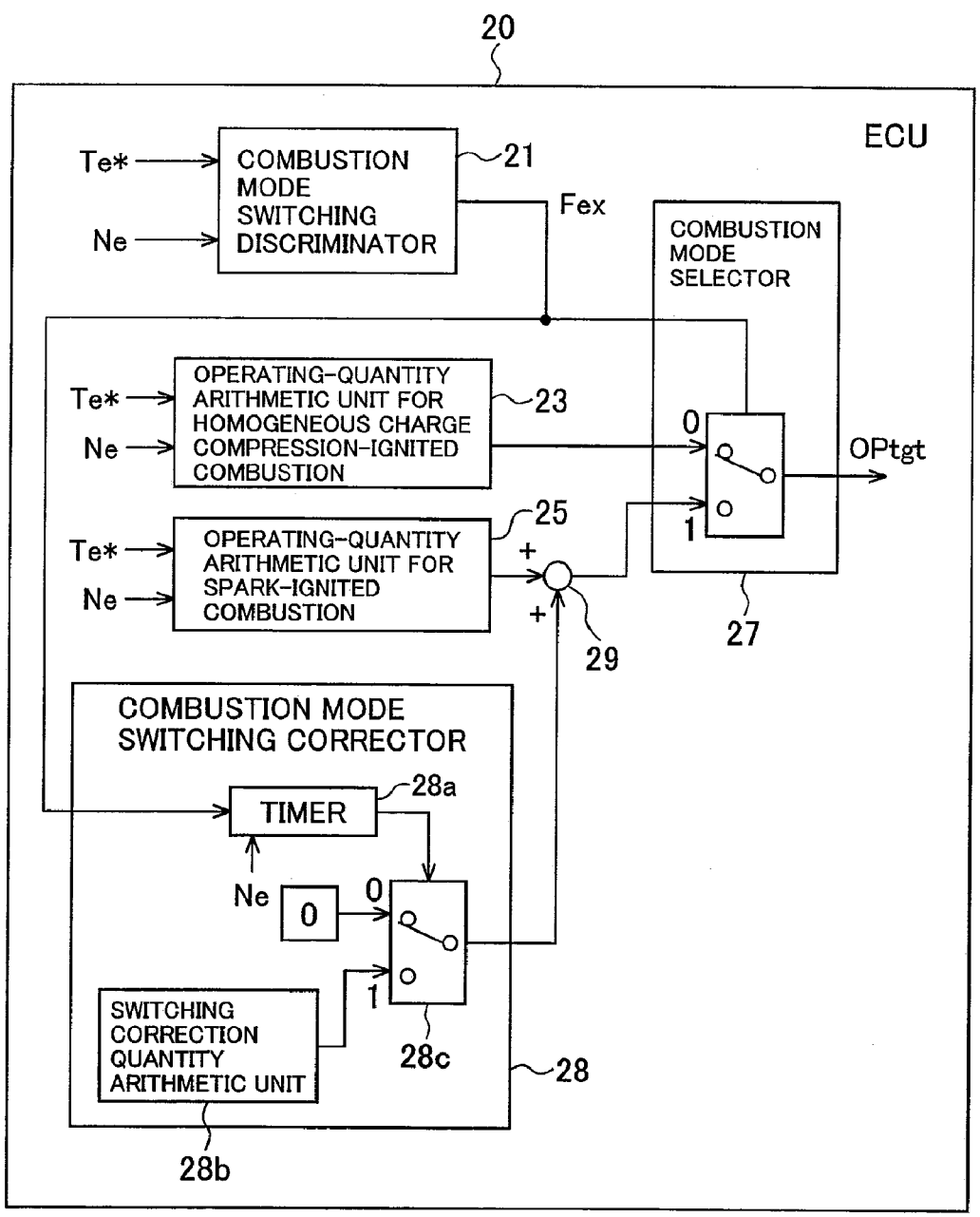
FIG. 3 is a control block diagram illustrating a combustion mode switching circuit composition of the control apparatus for controlling a homogeneous charge compression-ignited internal-combustion engine according to the first embodiment of the present invention.

FIG. 3 is a control block diagram illustrating the combustion mode switching circuit composition of the control apparatus for controlling a homogeneous charge compression-ignited internal-combustion engine according to the present embodiment.

When the ECU 20 switches a combustion mode from spark-ignited combustion to homogeneous charge compression-ignited combustion, or vice versa, the ECU 20 controls combustion mode switching to prevent engine performance and silence from deteriorating. The control of combustion mode switching from spark-ignited combustion to homogeneous charge compression-ignited combustion is described below. In particular, in the present embodiment, during the combustion mode switching period, the ECU 20 advances ignition timing and when the combustion mode is switched from spark-ignited combustion to combined combustion first and then from combined combustion to homogeneous charge compression-ignited combustion, the ECU 20 delays self-ignition timing or reduces a maximum in-cylinder pressure. Torque fluctuations and combustion noise can thus be reduced during mode switching from spark-ignited combustion to homogeneous charge compression-ignited combustion.

The ECU 20 has a combustion mode discriminator 21, an operating-quantity arithmetic unit 23 for homogeneous charge compression-ignited combustion, an operating-quantity arithmetic unit 25 for spark-ignited combustion, a combustion selector 27, a combustion mode switching corrector 28, and an adder 29. Only sections for combustion mode switching control are shown in FIG. 3, and other constituent elements are omitted therein.

The combustion mode discriminator 21 judges from the engine speed "Ne" and the engine torque requirement "Te*" of the engine 100 whether the homogeneous charge compression-ignited combustion mode or the spark-ignited combustion mode is to be executed, and turns on or off a combustion mode switching flag "Fex", depending upon particular judgment results. As described above, the required engine torque "Te*" is calculated within the ECU 20 separately on the basis of the accelerator angle that has been detected by the accelerator angle sensor 17. The engine speed "Ne" is calculated within the ECU 20 separately on the basis of the detection signal of the crank angle sensor 13.

Combustion regions associated with the spark-ignited combustion mode and the homogeneous charge compression-ignited combustion mode are described below using FIG. 4.

Figure 4:
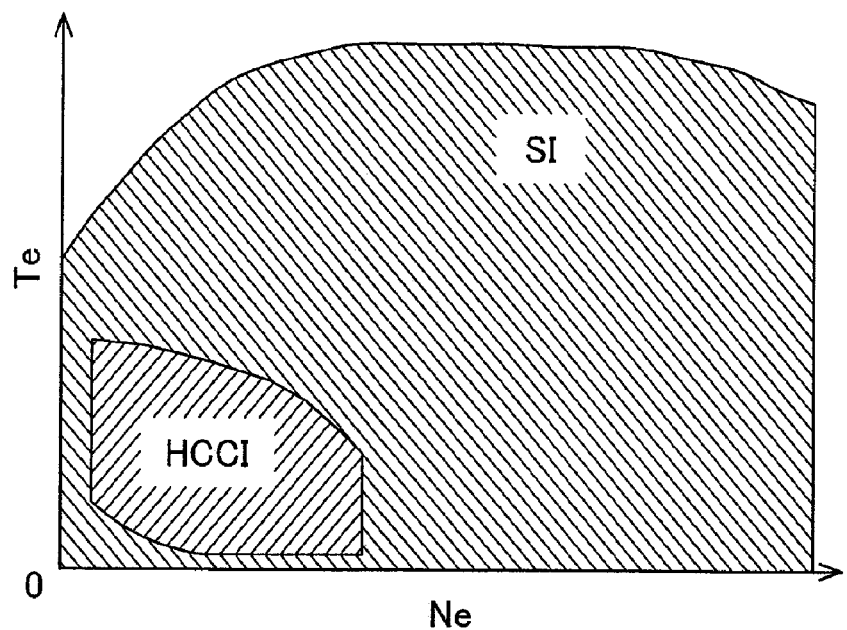
FIG. 4 is an explanatory diagram of combustion regions associated with a spark-ignited combustion mode and a homogeneous charge compression-ignited combustion mode.

FIG. 4 is an explanatory diagram of the combustion regions associated with the spark-ignited combustion mode and the homogeneous charge compression-ignited combustion mode.

A horizontal axis in FIG. 4 denotes the engine speed "Ne", and a vertical axis denotes the engine torque "Te".

As shown in FIG. 4, the spark-ignited (SI) combustion mode can be implemented in a wide engine-speed region from low speed to high speed and in a wide engine torque region from low torque to high torque.

The methods usable to implement the homogeneous charge compression-ignited (HCCI) combustion mode include intake air heating, high compression, internal EGR introduction, and so on. Of these methods, in consideration of costs and engine operation in the spark-ignited combustion mode, the introduction of internal EGR based on valve timing operations is a highly feasible method. During homogeneous charge compression-ignited combustion based on internal EGR introduction, the internal EGR rate inside the combustion chamber needs to be high. This will limit the amount of fresh air flowing into the cylinder, and will require a definite time for chemical reactions to occur during a time interval from the formation of the mixture to a start of the combustion. The homogeneous charge compression-ignited (HCCI) combustion mode can therefore be implemented in a low-load low-speed operating state of a naturally aspirated engine, as shown in FIG. 4.

Referring to FIG. 3, the combustion mode switching discriminator 21, for example, has a map indicating the operational state of the engine 100, based on the engine torque and the engine speed. The map is shown in FIG. 4. The combustion mode switching discriminator 21 checks against the operational state map of FIG. 4 according to the required engine torque "Te*" and the engine speed "Ne" and if the engine is in an operational state that makes the homogeneous charge compression-ignited combustion mode executable, the switching discriminator 21 judges homogeneous charge compression-ignited combustion to be executable, and sets the combustion mode switching flag "Fex" to an ON state (sets up 1). If the engine is in an operational state that makes the homogeneous charge compression-ignited combustion mode inexecutable, the combustion mode switching discriminator 21 judges that the execution of spark-ignited combustion mode is necessary, and sets the combustion mode switching flag "Fex" to an OFF state (sets up 0). The combustion mode switching flag "Fex" is output to the combustion selector 27.

In accordance with the engine speed "Ne" and the engine torque requirement "Te*" of the engine 100, the operating-quantity arithmetic unit 23 for homogeneous charge compression-ignited combustion calculates the engine parameters (operating quantities) required for homogeneous charge compression-ignited combustion. These engine parameters include the rate of fuel injection from the injector, the fuel injection timing in which the injection of the fuel from the injector is started, the ignition timing in which the release of a spark from the ignition plug is started, the opening angle of the throttle valve adapted to control the amount of air flowing into the combustion chamber, the opening/closing timing or valve lift of the intake valve or exhaust valve for controlling the amount of mixture flowing into the combustion chamber, the opening angle of the swirl control valve adapted to control the flow intensity of the mixture within the combustion chamber, and so on.

In accordance with the engine speed "Ne" and the engine torque requirement "Te*" of the engine 100, the operating-quantity arithmetic unit 25 for spark-ignited combustion calculates the engine parameters (operating quantities) required for spark-ignited combustion.

Depending upon the combustion mode switching flag "Fex" that is input from the combustion mode switching discriminator 21, the combustion selector 27 selects either the operating quantities for homogeneous charge compression-ignited combustion, output from the operating-quantity arithmetic unit 23, or the operating quantities for spark-ignited combustion, output from the operating-quantity arithmetic unit 25. If the state of the combustion mode switching flag "Fex" is ON (=1), the operating quantities for spark-ignited combustion will be selected and then output as target operating quantities "OPtgt" to the elements shown in FIG. 2, such as the electronically-controlled throttle driving circuit 20f, injector driving circuit 20g, ignition output circuit 20h, variable-valve driving circuit 20j, and swirl control valve driving circuit 20k. If the state of the combustion mode switching flag "Fex" is OFF (=0), the operating quantities for homogeneous charge compression-ignited combustion will be selected and then output as target operating quantities "OPtgt" to the elements shown in FIG. 2, such as the electronically-controlled throttle driving circuit 20f, injector driving circuit 20g, ignition output circuit 20h, variable-valve driving circuit 20j, and swirl control valve driving circuit 20k. As a result, the engine 100 in FIG. 1 will burn the mixture in either the homogeneous charge compression-ignited combustion mode or the spark-ignited combustion mode so as to output the required engine torque "Te*".

The target operating quantities "OPtgt" in either of the above two cases are the engine parameters of the elements operated when the engine 100 is controlled. More specifically, the target operating quantities "OPtgt" refer to the opening angle of the throttle valve 2 (throttle valve angle), a fuel injection pulse width or fuel injection timing signal to the injector 3, an ignition timing signal to the ignition plug 4, the opening/closing timing of the intake valve 5a and exhaust valve 5b, the opening angle of the swirl control valve 15 (SCV angle) for controlling the flow of the mixture in the combustion chamber.

The control apparatus in the present embodiment further has the combustion mode switching corrector 28 that operates immediately after the combustion mode has been switched from spark-ignited combustion to homogeneous charge compression-ignited combustion. The combustion mode switching corrector 28 includes a timer 28a, a switching correction quantity arithmetic unit 28b, and a selector 28c.

The combustion mode switching flag "Fex" is input to the timer 28a, and during the execution of spark-ignited combustion, if the combustion mode switching flag changes from OFF (=0) to ON (=1), the timer 28a will output 1 as a high (HI)-level signal for a fixed time "tm". After a lapse of the fixed time, the timer 28a will output 0 as a low (LO)-level signal.

In order to realize a combined combustion mode executable immediately after combustion mode switching from spark-ignited combustion to homogeneous charge compression-ignited combustion, the switching correction quantity arithmetic unit 28b computes and outputs correction quantities with respect to the operating quantities for homogeneous charge compression-ignited combustion. The combined combustion mode will be described later herein using FIG. 8.

If the output from the timer 28a is the HI-level signal (1), the selector 28c will select the correction quantities output from the switching correction quantity arithmetic unit 28b with respect to the operating quantities for homogeneous charge compression-ignited combustion, and output the selected correction quantities to the adder 29. If the output from the timer 28a is the LO-level signal (0), the selector 28c will select 0 as correction data, and output the correction data to the adder 29. During a required time "tm" from completion of combustion mode switching from spark-ignited combustion to homogeneous charge compression-ignited combustion, therefore, the adder 29 outputs to the combustion selector 27 the operating quantities obtained by adding the correction quantities output from the switching correction quantity arithmetic unit 28b with respect to the operating quantities for homogeneous charge compression-ignited combustion, to the operating quantities output from the operating-quantity arithmetic unit 23 for homogeneous charge compression-ignited combustion. As a result, during the required time "tm" from completion of combustion mode switching from spark-ignited combustion to homogeneous charge compression-ignited combustion, the operating quantities that have been obtained by the above addition are output as target operating quantities "OPtgt" from the adder 29 to the electronically-controlled throttle driving circuit 20f, the injector driving circuit 20g, the ignition output circuit 20h, the variable-valve driving circuit 20j, the swirl control valve driving circuit 20k, etc. The required time "tm" is variable according to the particular engine speed "Ne". For example, if the engine speed is low, "tm" can be about 100 ms, and if the engine speed is high, "tm" can be about 300 ms.

However, if the combustion mode switching flag changes from ON (=1) to OFF (=0) during the correction quantity adding period, the combustion selector 27 will immediately select the operating quantities for spark-ignited combustion, as the target operating quantities.

In the above description, the switching correction quantity adding period commences immediately after the OFF (=0) to ON (=1) change of the combustion mode switching flag based on the operating state of the engine 100, but the commencement timing of the period may be defined using other methods. For example, the switching correction quantity adding period may commence synchronously when a fluctuation rate of spark-ignited combustion exceeds a required value based on the regions shown in FIG. 5. The combustion fluctuation rate may be detected indirectly from the preassigned engine parameters described above, or may be detected directly on the basis of such output data as from an in-cylinder pressure sensor and knocking sensor equipped in or at the engine 100.

In addition, although the switching correction quantity adding period is completed after a required time from the commencement of the adding period, the completion timing of the adding period may be defined using other methods. For example, the switching correction quantity adding period may be completed after homogeneous charge compression-ignited combustion has been continued for a required time on the basis of such output data as from the in-cylinder pressure sensor and knocking sensor equipped in or at the engine 100. Alternatively, the switching correction quantity adding period may be completed after a lapse of a required time from a change to a state in the homogeneous charge compression-ignited combustion region, or may be completed at the same time that the exhaust gas temperature detected by the exhaust gas temperature sensor 11 decreases below a predetermined value.

In the description given later herein, the commencement timing of the switching correction quantity adding period is synchronous with the timing in which the combustion mode switching flag changes from OFF (=0) to ON (=1). Additionally, the completion timing of the switching correction quantity adding period is synchronous with the elapse of the required time after the transition to the homogeneous charge compression-ignited combustion region, based on the regions shown in FIG. 5.

As described above, in the present embodiment, when the combustion mode is switched from spark-ignited combustion to homogeneous charge compression-ignited combustion, the mixture goes through combined combustion mode before homogeneous charge compression-ignited combustion is executed. As described later, combustion noise is reduced by required correction in the combined combustion mode.

Figure 5:
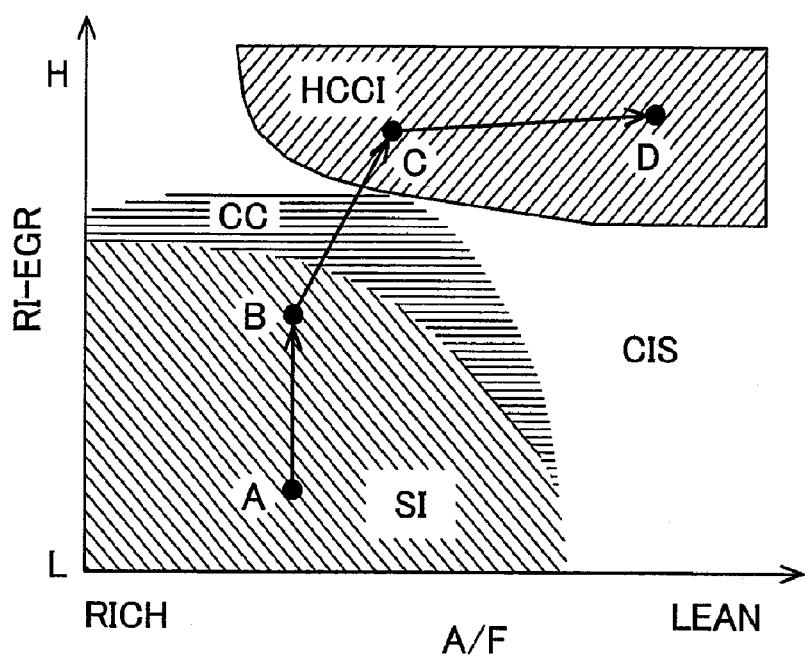
FIG. 5 is an explanatory diagram of combustion mode switching by the control apparatus for controlling a homogeneous charge compression-ignited internal-combustion engine according to the first embodiment of the present invention.

Combustion mode switching by the control apparatus for controlling a homogeneous charge compression-ignited internal-combustion engine according to the first embodiment of the present invention will be next described using FIG. 5.

FIG. 5 is an explanatory diagram of combustion mode switching by the control apparatus for controlling a homogeneous charge compression-ignited internal-combustion engine according to the present embodiment.

Referring to FIG. 5, a horizontal axis denotes an air-fuel (A/F) mixture ratio. The mixture is lean (Le) if its distribution is located to the right of an A/F value of 14.7 in FIG. 5. The mixture is rich (Ri) if its distribution is located to the left of the A/F value of 14.7. A horizontal axis denotes an internal EGR rate (RI-EGR). The internal EGR rate is higher if it is located closer to an upper end of FIG. 5, and lower if located closer to a lower end.

FIG. 5 shows the spark-ignited combustion region and the homogeneous charge compression-ignited combustion region, with attention being focused upon the in-cylinder A/F mixture ratio and internal EGR rate RI-EGR in the naturally aspirated engine where homogeneous charge compression-ignited combustion based on internal EGR introduction is implemented. FIG. 5, however, assumes that the engine torque and the engine speed are substantially constant in the entire region.

In FIG. 5, stable spark-ignited (SI) combustion can be executed in the SI combustion region where the A/F mixture is relatively rich and RI-EGR is relatively low. Conversely, stable homogeneous charge compression-ignited (HCCI) combustion can be executed in the HCCI combustion region where the A/F mixture is relatively lean and RI-EGR is relatively high. An unstable combustion region CIS in which stable HCCI combustion and stable SI combustion both become difficult to execute is present between the HCCI and SI combustion regions.

In the present embodiment, while the engine is burning the mixture at an A/F ratio of near 14.7 and a low RI-EGR value in the SI combustion region, as in a state of point A, the RI-EGR value is raised for the mixture to be burnt in a state of point B in the engine. After this, the combustion mode is switched to allow combustion at point C in the HCCI combustion region. However, since the unstable combustion region CIS is present between the SI and HCCI combustion regions, a combined combustion region CC in which the mixture can be stably burnt is generated by changing the operating quantities of the engine. Spark-ignited combustion and homogeneous charge compression-ignited combustion simultaneously occur in combined form in the combined combustion region CC. Combustion control is switched from point B of the SI combustion region through the combined combustion region CC to point C of the HCCI combustion region. Additionally, the A/F ratio is shifted to point D in the HCCI combustion region to make the mixture lean.

Figure 6:
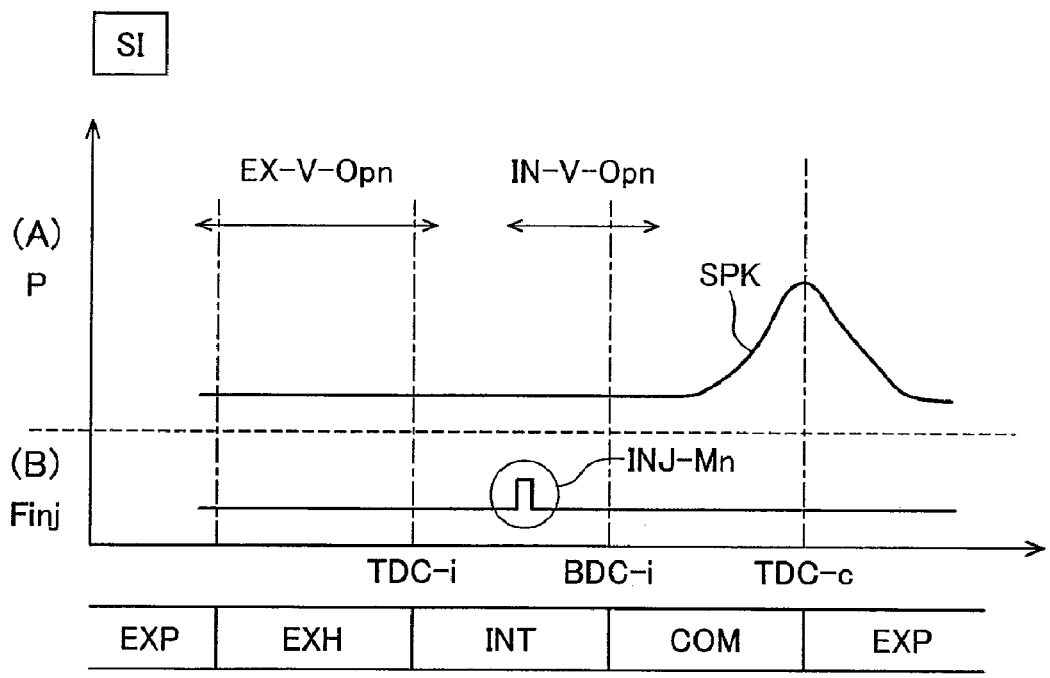
FIG. 6 is a timing chart that shows an outline of engine operation in the SI combustion mode of the HCCI internal-combustion engine control apparatus according to the first embodiment of the present invention.
Figure 7:
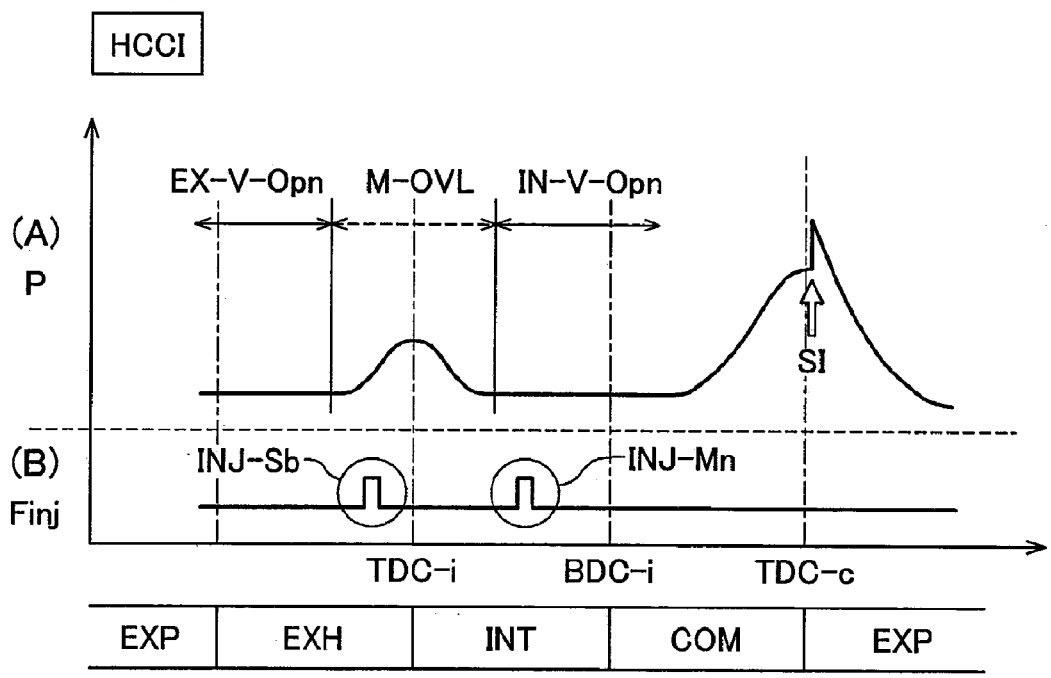
FIG. 7 is a timing chart that shows the outline of engine operation in the HCCI combustion mode of the HCCI internal-combustion engine control apparatus according to the first embodiment of the present invention.
Figure 8:
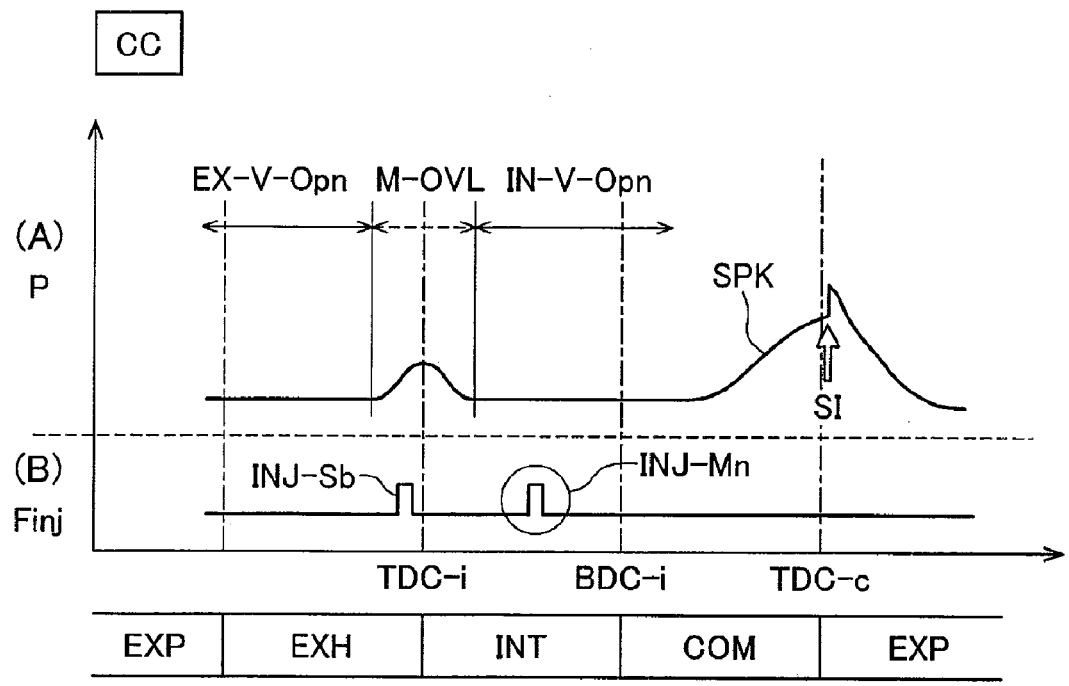
FIG. 8 is a timing chart that shows the outline of engine operation in a CC mode of the HCCI internal-combustion engine control apparatus according to the first embodiment of the present invention.

Next, engine operation in the spark-ignited (SI) combustion, homogeneous charge compression-ignited (HCCI) combustion, and combined combustion (CC) modes, based on the HCCI internal-combustion engine control apparatus of the present embodiment will be outlined using FIGS. 6 to 8.

FIG. 6 is a timing chart that shows the outline of engine operation in the SI combustion mode of the HCCI internal-combustion engine control apparatus according to the first embodiment of the present invention. FIG. 7 is a timing chart that shows the outline of engine operation in the HCCI combustion mode of the HCCI internal-combustion engine control apparatus according to the first embodiment of the invention. FIG. 8 is a timing chart that shows the outline of engine operation in the CC mode of the HCCI internal-combustion engine control apparatus according to the first embodiment of the invention.

First, engine operation in the SI combustion mode is outlined below using FIG. 6.

Reference symbol (A) in FIG. 6 denotes an in-cylinder pressure P, and (B) denotes a fuel injection signal Finj. A horizontal axis denotes an expansion stroke EXP, an exhaust stroke EXH, an intake stroke INT, and a compression stroke COM.

Exhaust valve opening period EX-V-opn in the figure indicates a period for which the exhaust valve is open. In the SI combustion mode, the exhaust valve is open from nearly an end of the expansion stroke EXP via the exhaust stroke EXH to nearly a beginning of the intake stroke INT.

Intake valve opening period IN-V-opn indicates a period for which the intake valve is open. In the SI combustion mode, the intake valve is open from nearly the end of the expansion stroke EXP via the exhaust stroke EXH to nearly the beginning of the intake stroke INT.

For SI combustion, air is drawn from the intake pipe 6 of FIG. 1 via the intake valve 5$a$ into the cylinder 7, and as denoted by symbol (B) in FIG. 6, a fuel is injected into the cylinder in required timing of the intake stroke. This injection, referred to as main fuel injection INJ-Mn, forms a mixture. As denoted by symbol (A) in FIG. 6, a spark from the ignition plug 4 makes the mixture explode in required ignition timing of the compression stroke, that is, in the ignition SPK timing denoted as (A) in FIG. 6. A consequential combustion pressure pushes the piston downward to provide driving force to the engine. Additionally, after the explosion, exhaust gases are passed into the three-way catalyst 10 via the exhaust pipe 8. After this, the exhaust gases are cleaned by the three-way catalyst 10 and discharged to outside.

Engine operation in the HCCI combustion mode is outlined below using FIG. 7. Reference symbol (A) in FIG. 7 denotes the in-cylinder pressure P, and (B) denotes the fuel injection signal Finj. A horizontal axis denotes the expansion stroke EXP, the exhaust stroke EXH, the intake stroke INT, and the compression stroke COM.

Exhaust valve opening period EX-V-opn in the figure indicates the period for which the exhaust valve is open. In the HCCI combustion mode, the exhaust valve closes midway in the exhaust stroke EXH.

Intake valve opening period IN-V-opn indicates the period for which the intake valve is open. In the HCCI combustion mode, the intake valve begins to open midway in the intake stroke INT.

Therefore, there is a minus overlap period M-OVL for which both the exhaust valve and the intake valve are closed, and during this period, an intake top dead center TDC-i is reached nearly between the EX-V-opn and IN-V-opn periods. Whereas a period for which the exhaust valve and the intake valve are both open is termed a plus overlap period, the period for which both the exhaust valve and the intake valve are closed is termed the minus overlap period M-OVL. In the minus overlap period M-OVL, since complete exhaust is not conducted, internal EGR components remain inside the cylinder 7. As denoted by symbol (A) in FIG. 7, therefore, the in-cylinder pressure P increases in a second half of the exhaust stroke EXH during the minus overlap period M-OVL.

As denoted by (B) in FIG. 7, in a first half of the minus overlap period M-OVL, that is, slightly before the intake top dead center TDC-i is reached following completion of exhaust valve closing, fuel injection from the injector 3 occurs (subsidiary fuel injection INJ-Sb). The subsidiary fuel injection reforms the fuel, thus generating an igniting agent.

Additionally, upon opening of the intake valve in the intake stroke, air is drawn from the intake pipe 6 via the intake valve 5$a$ into the cylinder 7, in which timing, the main fuel injection INJ-Mn is re-executed to form a mixture. A self-ignition (SI) by piston compression makes the mixture explode, and the resulting combustion pressure pushes the piston downward to provide driving force to the engine. After this, as in spark-ignited combustion, exhaust gases are cleaned by the three-way catalyst 10 and discharged to outside.

Next, engine operation in the combined combustion (CC) mode is outlined below using FIG. 8. Reference symbol (A) in FIG. 8 denotes the in-cylinder pressure P, and (B) denotes the fuel injection signal Finj. A horizontal axis denotes the expansion stroke EXP, the exhaust stroke EXH, the intake stroke INT, and the compression stroke COM.

Exhaust valve opening period EX-V-opn in the figure indicates the period for which the exhaust valve is open. In the combined combustion (CC) mode, the exhaust valve closes midway in the exhaust stroke EXH.

Intake valve opening period IN-V-opn indicates the period for which the intake valve is open. In the combined combustion (CC) mode, the intake valve begins to open midway in the intake stroke INT.

Therefore, there is the minus overlap period M-OVL for which both the exhaust valve and the intake valve are closed, and during this period, the intake top dead center TDC-i is reached nearly between the EX-V-opn and IN-V-opn periods. As can be seen by comparing FIG. 8 with FIG. 7, the timing in which the exhaust valve closes is delayed behind the closing timing thereof in the HCCI combustion mode of FIG. 7, and the timing in which the intake valve opens is advanced. The minus overlap period M-OVL, therefore, is correspondingly shorter than in the HCCI combustion mode. In the minus overlap period M-OVL, since complete exhaust is not conducted, internal EGR components remain inside the cylinder 7. Because of the short minus overlap period M-OVL, the quantity of internal EGR components remaining inside the cylinder is small, compared with the residual quantity of internal EGR components in the HCCI combustion mode. As denoted by symbol (A) in FIG. 8, therefore, the in-cylinder pressure P increases in the second half of the exhaust stroke EXH during the minus overlap period M-OVL.

As denoted by (B) in FIG. 8, in the first half of the minus overlap period M-OVL, that is, slightly before the intake top dead center TDC-i is reached following completion of exhaust valve closing, fuel injection from the injector 3 occurs (subsidiary fuel injection INJ-Sb). The subsidiary fuel injection reforms the fuel, thus generating an igniting agent.

In the intake stroke, air is drawn from the intake pipe 6 via the variable valve 5$a$ into the cylinder 7, and as denoted by symbol (B) in FIG. 8, the main fuel injection INJ-Mn is executed to form a mixture. In the compression stroke, the ignition plug 4 generates a spark in the SPK ignition timing denoted by symbol (A) in FIG. 8, and the mixture explodes. The resulting pressure rise and an internal EGR introduction effect cause the mixture not yet in a spark-ignited (SI) combustion state to explode by self-ignition, and the resulting combustion pressure pushes the piston downward to provide motive energy as the engine. After this, as in spark-ignited combustion, exhaust gases are cleaned by the three-way catalyst 10 and discharged to outside.

Control by the HCCI internal-combustion engine control apparatus according to the present embodiment is described below using FIGS. 9 to 13.

Figure 9:
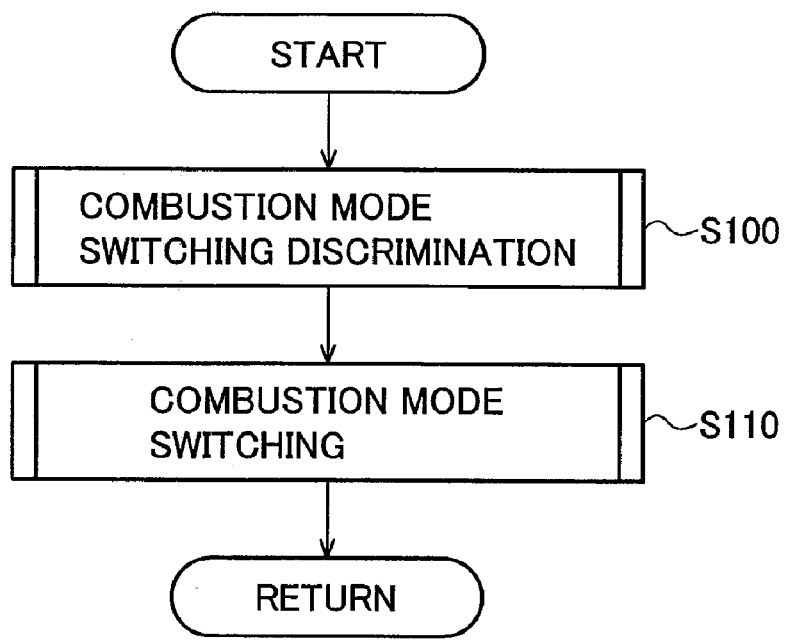
FIG. 9 is a flowchart that shows overall control by the HCCI internal-combustion engine control apparatus according to the first embodiment of the present invention.
Figure 10:
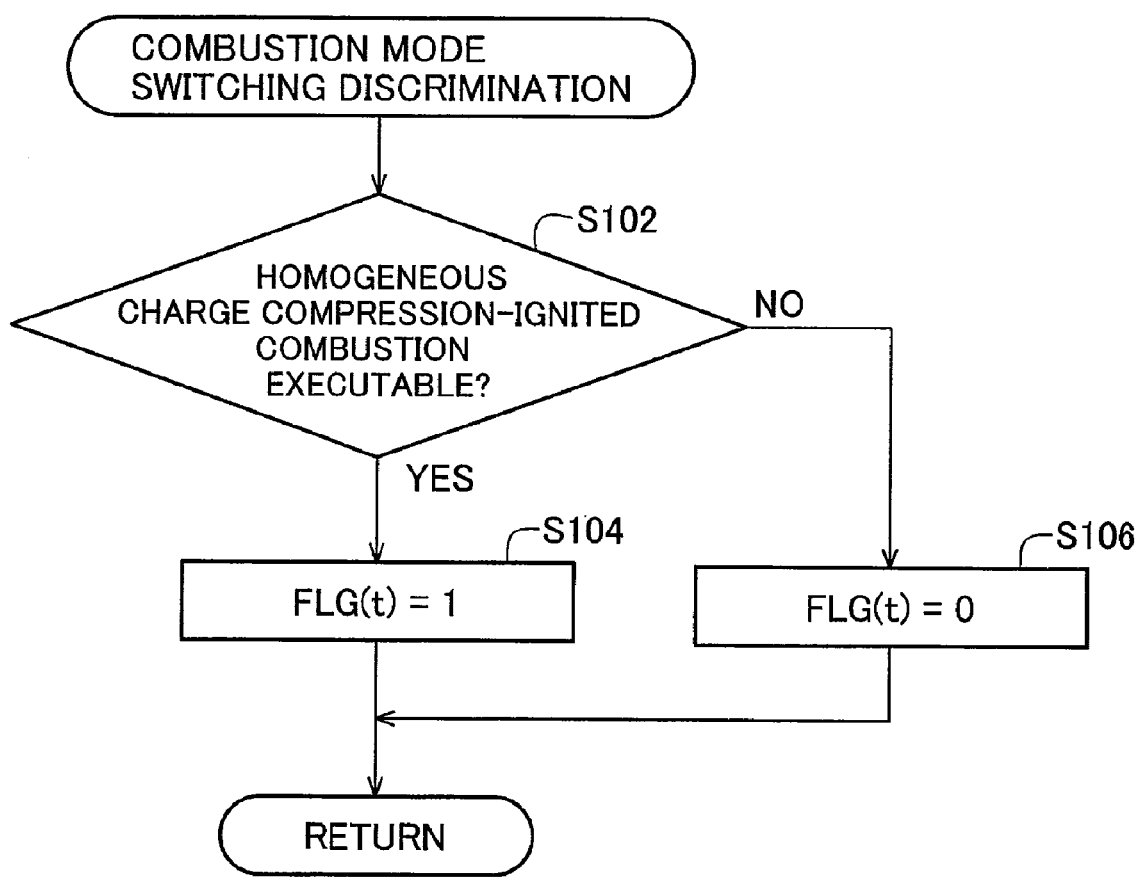
FIG. 10 is a flowchart that shows details of combustion mode switching discrimination step S100 shown in FIG. 9.
Figure 11:
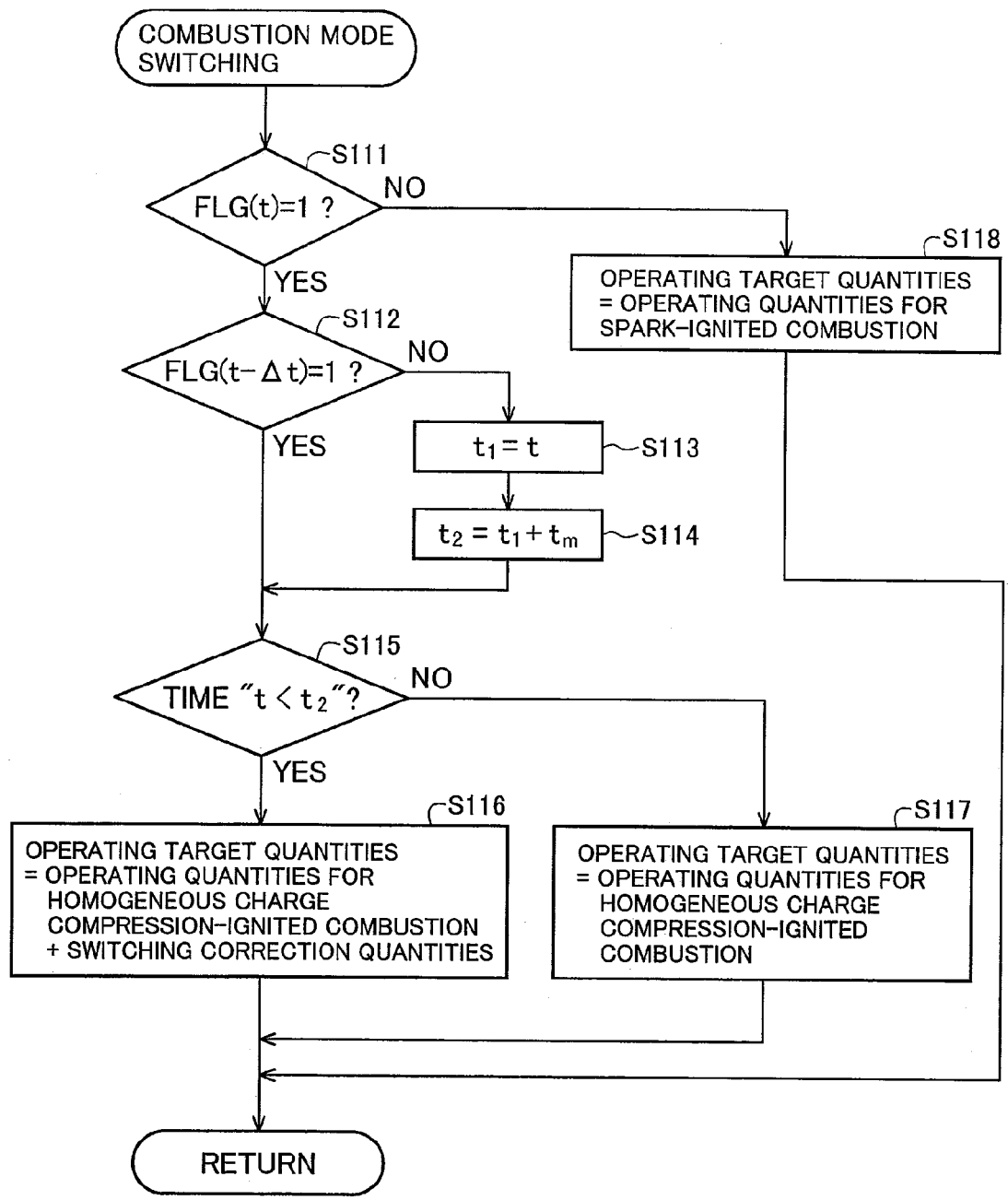
FIG. 11 is a flowchart that shows details of combustion mode switching step S110 shown in FIG. 9.
Figure 12:
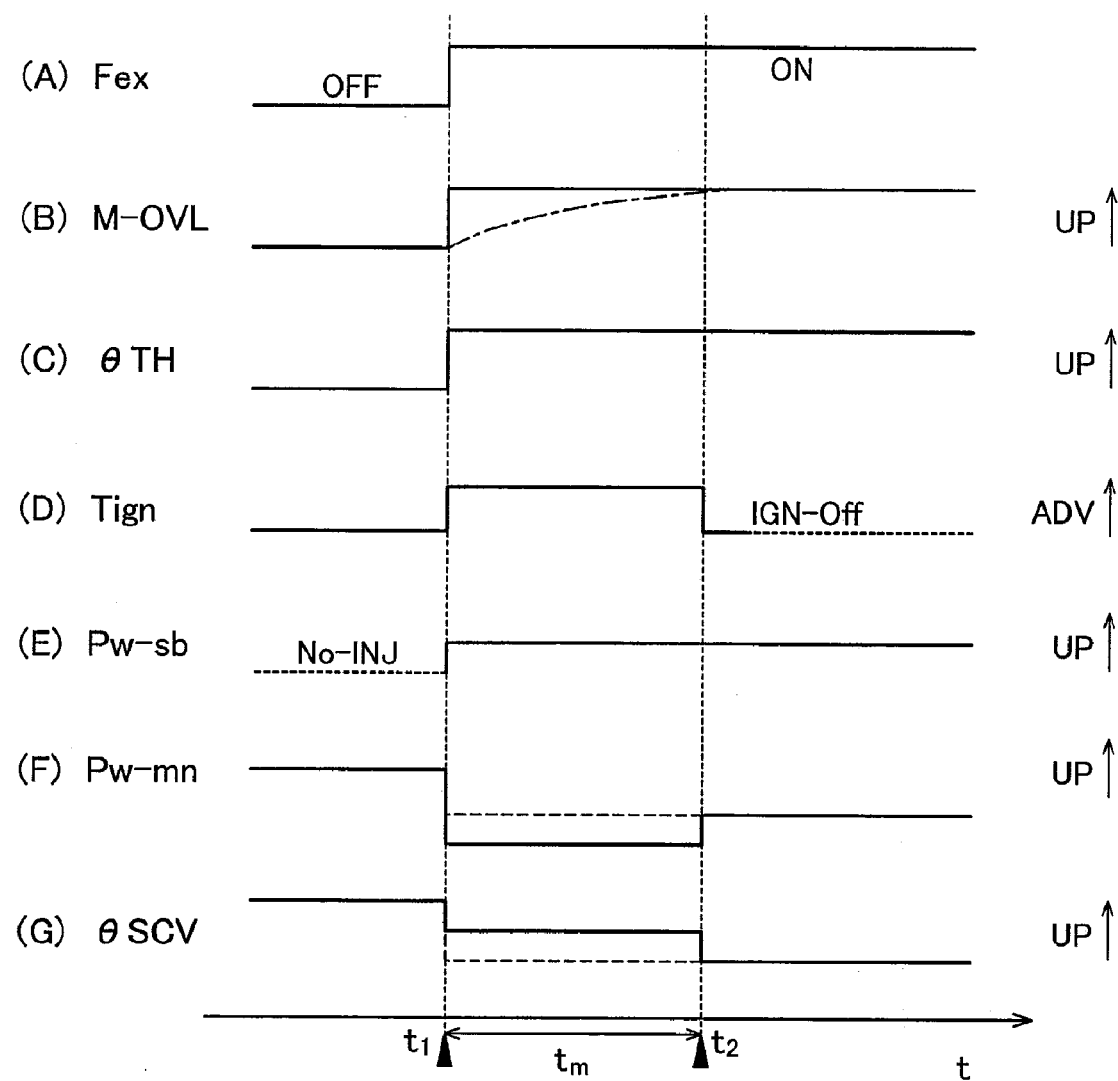
FIG. 12 is a timing chart that shows details of control by the HCCI internal-combustion engine control apparatus according to the first embodiment of the present invention.
Figure 13:
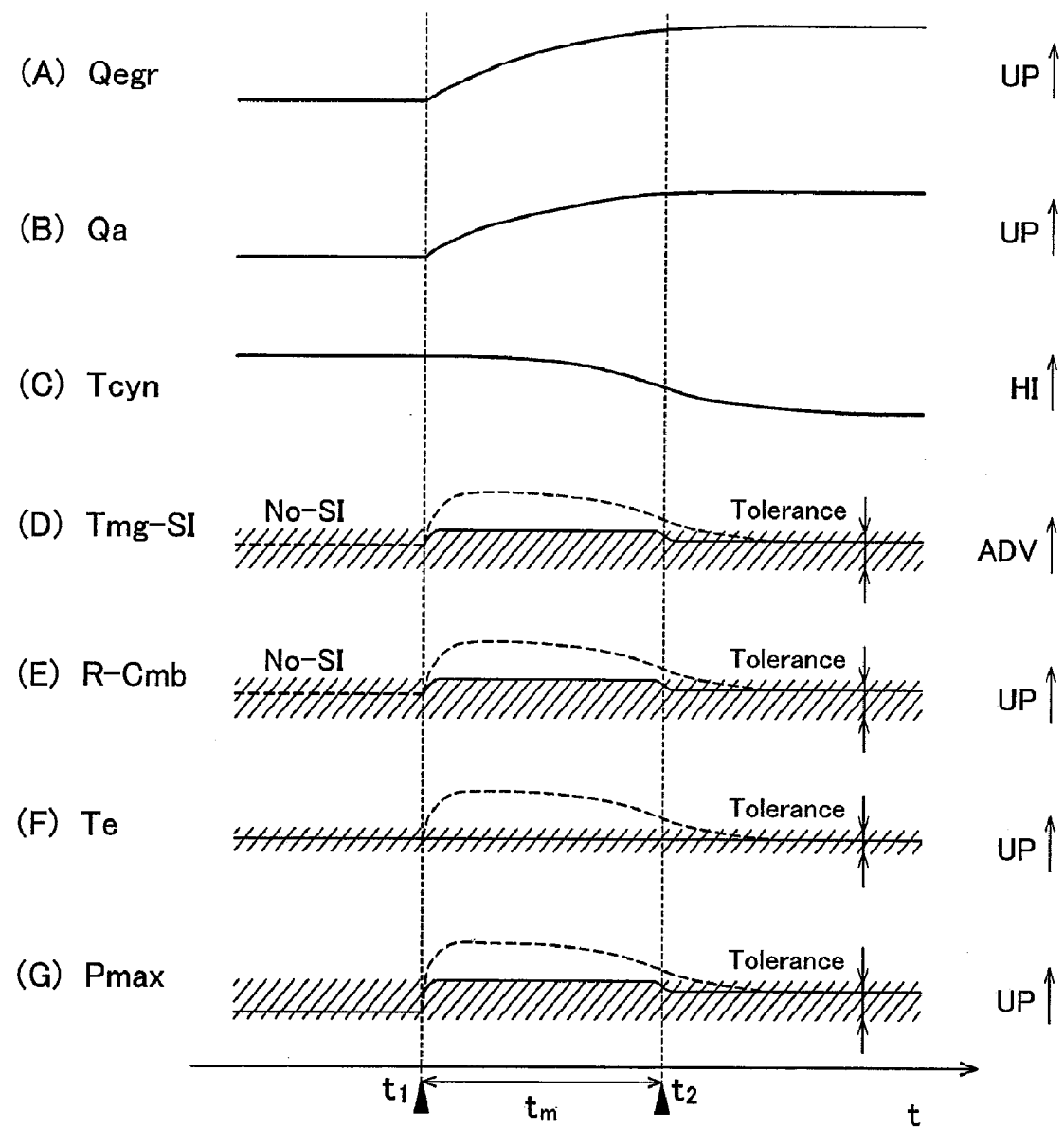
FIG. 13 is a timing chart that shows operational states of the engine in which combustion mode switching from spark-ignited combustion to homogeneous charge compression-ignited combustion is conducted by the HCCI internal-combustion engine control apparatus according to the first embodiment of the present invention.

FIG. 9 is a flowchart that shows overall control by the HCCI internal-combustion engine control apparatus according to the first embodiment of the present invention. FIG. 10 is a flowchart that shows details of the combustion mode switching discrimination step S100 shown in FIG. 9. FIG. 11 is a flowchart that shows details of combustion mode switching step S110 shown in FIG. 9. FIG. 12 is a timing chart that shows details of control by the HCCI internal-combustion engine control apparatus according to the first embodiment of the present invention. FIG. 13 is a timing chart that shows operational states of the engine in which combustion mode switching from spark-ignited combustion to homogeneous charge compression-ignited combustion is conducted by the HCCI internal-combustion engine control apparatus according to the first embodiment of the present invention.

Overall control by the HCCI internal-combustion engine control apparatus of the present embodiment is first described using FIG. 9.

In step S100 of FIG. 9, the combustion mode switching discriminator 21 in FIG. 3 first judges whether SI (spark-ignited) combustion or HCCI (homogeneous charge compression-ignited) combustion is appropriate for a current operational state of the engine. If the SI combustion mode is appropriate, combustion mode switching flag "Fex(t)" is set to OFF (=0). If the HCCI combustion mode is appropriate, the combustion mode switching flag is set to ON (=1). Variable "t" in the flag denotes time. Step S100 will be detailed later herein using FIG. 10.

Next, in step S110 of FIG. 9, in order to execute the combustion mode determined by the setting of combustion mode switching flag "Fex(t)" that is execution results of step S100, the combustion mode selector 27 in FIG. 3 assigns the operating quantities appropriate for the selected combustion mode. Immediately after switching from the SI combustion mode to the HCCI combustion mode, the combustion mode switching corrector 28 outputs correction quantities to suppress the deterioration of the engine in performance and in silence. Step S110 will be detailed later herein using FIG. 11.

Detailed control in combustion mode switching discrimination step S100 of FIG. 9 is next described using FIG. 10.

In step S102, the combustion mode selector 27 in FIG. 3 judges the executability of HCCI combustion in accordance with the map of FIG. 4 that represents the operational state determined by the required torque and the engine speed. Control is advanced to step S104 if the engine is in a state that makes HCCI combustion executable. Control is advanced to step S106 if the engine is in a state that makes SI combustion executable.

In step S104, the combustion mode selector 27 sets the combustion mode switching flag "Fex(t)" to ON (=1) to execute HCCI combustion, and completes all related successive actions of the selector.

In step S106, the combustion mode selector 27 sets the combustion mode switching flag "Fex(t)" to OFF (=0) to execute SI combustion, and completes all related successive actions of the selector.

Detailed control in combustion mode switching discrimination step S110 of FIG. 9 is next described using FIG. 11.

In step S111, the combustion mode selector 27 in FIG. 3 judges whether the setting of the combustion mode switching flag "Fex(t)" in step S100 is ON (=1). If the setting of "Fex(t)" is 1, that is, if HCCI is the executable combustion mode, control is advanced to step S112. If the setting of "Fex(t)" is 0, that is, if SI is the executable combustion mode, control is advanced to step S118.

If the HCCI combustion mode is executable, it is judged whether the setting of the combustion mode switching flag "Fex" is ON (=1) at a time of $\Delta t$ before the time "t", that is, at time "t-$\Delta t$" in step S112. If the setting of the combustion mode switching flag "Fex" is 1, control is advanced to step S115. If the setting of the combustion mode switching flag is not 1, control is advanced to step S113. In other words, control is advanced to step S113, only immediately after the setting of the combustion mode switching flag "Fex" has been changed from 0 to 1, that is, only immediately after the combustion mode has been switched from SI combustion to HCCI combustion.

In step S113, current time "t" is set up as time "t1", and in step S114, time "t1+tm" is set up as time "t2". The time "tm" is a setting of the timer 28a shown in FIG. 3. It is assumed that the time "tm" is variable according to the particular engine speed "Ne".

Next, in step S115, it is judged whether the current time "t" in the combustion mode switching flag "Fex(t)" is the same as the time "t2". If the time "t" is less than the time "t2", that is, if the elapsed time from completion of switching from the SI combustion mode to the HCCI combustion mode is less than the time "tm", then this period is judged to be the switching correction quantity adding period, and control is advanced to step S116. If the time "t" is past the time "t2", the combustion mode is judged to have been switched to HCCI combustion, and control is advanced to step S117.

After switching from the SI combustion mode to the HCCI combustion mode, until the time "tm" elapses, the combustion mode switching corrector 28 in FIG. 3 will, in step S116, select and output the switching correction quantities output from the switching correction quantity arithmetic unit 28b. Next after the selected switching correction quantities have been added to the operating quantities for HCCI combustion, the combustion mode switching corrector 28 acquires and sets addition results as the target operating quantities from the combustion mode selector 27, and completes the successive actions. As will be described later using FIG. 12, data for implementing early ignition and for increasing the SCV angle is employed as the switching correction quantities in the present embodiment.

After the elapse of the time "tm" following completion of combustion mode switching from SI combustion to HCCI combustion, step S117 is executed for the combustion mode switching corrector 28 in FIG. 3 to output 0 as the correction data, set the HCCI combustion-use operating quantities from the combustion mode selector 27 as target operating quantities, and completes the successive actions.

In the SI combustion mode, step S118 is executed for the combustion mode selector 27 to output the SI combustion-use operating quantities as target operating quantities, and completes the successive actions.

More specific details of control by the HCCI internal-combustion engine control apparatus according to the present embodiment are described below using FIG. 12. Data for implementing early ignition and for increasing the SCV angle is employed as the switching correction quantities.

A horizontal axis in FIG. 12 denotes time. A vertical axis of symbol (A) in FIG. 12 denotes the ON (=1)/OFF (=0) state of the combustion mode switching flag "Fex". A vertical axis of symbol (B) in FIG. 12 denotes the minus overlap period M-OVL described in FIGS. 7 and 8. The minus overlap period M-OVL increases as a line indicating this variable goes upward in FIG. 12. A vertical axis of symbol (C) in FIG. 12 denotes the throttle angle θTH. The throttle angle θTH increases as a line indicating this variable goes upward in FIG. 12. A vertical axis of symbol (D) in FIG. 12 denotes the ignition timing TIGN. The ignition timing TIGN advances as a line indicating this variable goes upward in FIG. 12. A vertical axis of symbol (E) in FIG. 12 denotes pulse width "Pw-sb" of the subsidiary fuel injection described in FIGS. 7 and 8. The pulse width "Pw-sb" of the subsidiary fuel injection increases as a line indicating this variable goes upward in FIG. 12. A vertical axis of symbol (F) in FIG. 12 denotes pulse width "Pw-mn" of the main fuel injection described in FIGS. 7 and 8. The pulse width "Pw-mn" of the main fuel injection increases as a line indicating this variable goes upward in FIG. 12. A vertical axis of symbol (G) in FIG. 12 denotes the opening angle "θSCV" of the swirl control valve described in FIG. 1. The opening angle "θSCV" of the swirl control valve (SCV) increases as a line indicating this variable goes upward in FIG. 12.

Time "t1" on the horizontal axis of FIG. 12 indicates the starting time of switching from the SI combustion mode to the HCCI combustion mode. Time "t2" indicates the ending time of the switching correction quantity addition in the combustion mode switching control of the present embodiment.

Before the time "t1", therefore, the engine is burning the mixture in the SI combustion mode shown in FIG. 6. After the time "t2", the engine is burning the mixture in the HCCI combustion mode shown in FIG. 7. From the time "t1" to the time "t2", the combustion mode is HCCI combustion, but since the operating quantities obtained by adding the switching correction quantities output from the combustion mode switching corrector of FIG. 3 to the HCCI combustion-use operating quantities are adopted as target operating quantities, the engine is burning the mixture in the combined combustion mode shown in FIG. 8.

During the period from the time "t1" to the time "t2", dotted lines of the items denoted by symbols (F) and (G) in FIG. 12 indicate the respective operating quantities used if the switching correction quantities are not added thereto. Solid lines indicate the respective operating quantities used when the switching correction quantities are added to the HCCI combustion-use operating quantities according to the present embodiment.

During the period from the time "t1" to the time "t2", a solid line of the item denoted by symbol (B) in FIG. 12 indicates a target value of the minus overlap period M-OVL. A broken line indicates an actual minus overlap period M-OVL. That is to say, at the time "t1", even if a command is output that increases the target value of the minus overlap period M-OVL stepwise as indicated by the solid line, since there is a response delay until the variable valve 5 actually starts operating, the actual minus overlap period M-OVL increases with a first-order lag, as indicated by the broken line. For the throttle angle θTH shown as (C) in FIG. 12, an error due to a response delay also exists between the target value and actual value of the angle, but since the delay is quantitatively smaller than that of the variable valve 5, the solid line shown for the angle indicates the target value. In addition, it is assumed that the actual value is equal to the target value.

The (time "t2"–time "t1"), or the required time "tm", can be changed according to the particular engine speed "Ne". For example, "tm" can be changed to about 100 ms for low engine speed, or about 300 ms for high engine speed. The required time "tm" is a time equivalent to the response delay of the variable valve.

A case in which the switching correction of the operating quantities, based on the present embodiment, is not conducted is first described below.

At the time "t1", if HCCI combustion is judged to be executable, the combustion mode switching flag "Fex" is set to ON (=1) as denoted by symbol (A) in FIG. 12. In addition, in order to implement HCCI combustion, the minus overlap period M-OVL is increased as denoted by symbol (B) in FIG. 12, the throttle angle θTH is increased as denoted by symbol (C) in FIG. 12, and subsidiary fuel injection is started as denoted by symbol (D) in FIG. 12. Before the time "t1", sub-combustion is not conducted (No-INJ). At time "t1", the main fuel injection pulse width is reduced as indicated by the dotted line of symbol (E) in FIG. 12, and the SCV angle θSCV is reduced to zero as indicated by the dotted line of symbol (F) in FIG. 12. Next upon implementation of HCCI combustion, an ignition signal is turned off (IGN-OFF).

A case in which the switching correction of the operating quantities, based on the present embodiment, is conducted is next described below.

At the time "t1", if, as denoted by symbol (A) in FIG. 12, the combustion mode switching discriminator 21 judges HCCI combustion to be executable, the combustion mode switching flag "Fex" is set to ON (=1) and the combustion mode is switched from SI combustion to HCCI combustion. Setting of the combustion mode switching flag "Fex" to ON (=1) increases the minus overlap period M-OVL and the throttle angle θTH, as denoted by symbols (B) and (C), respectively, of FIG. 12.

As denoted by symbol (D) in FIG. 12, adding an associated switching correction quantity advances the ignition timing TIGN relative to that defined by the corresponding operating quantity for SI combustion or HCCI combustion. It is assumed that the switching correction quantity adding period is from the time "t1" to the time "t2", wherein "t2" is an elapsed time of "tm" from the time "t1". The ignition signal is turned off after HCCI combustion has been successfully implemented.

As denoted by symbol (E) in FIG. 12, subsidiary fuel injection is started at the time "t1" to execute HCCI combustion. The injection timing is as shown in FIG. 8.

Additionally, as denoted by symbol (F) in FIG. 12, upon the start of subsidiary fuel injection, the main fuel injection pulse width "Pw-mn" is reduced below the associated operating quantity for HCCI combustion, only during the period from the time "t1" to the time "t2".

Furthermore, as denoted by symbol (G) in FIG. 12, during the period from the time "t1" to the time "t2", the SCV angle θSCV is set to be smaller than the associated operating quantity for SI combustion, and larger than the associated operating quantity for HCCI combustion.

The above-described operating quantities for SI combustion, operating quantities for HCCI combustion, switching correction quantities, and the period from the time "t1" to the time "t2" are settings predetermined by testing or simulation, and these settings differ according to particular operating conditions of the engine 100. The above settings may be determined in accordance with the output data from the combustion mode detection sensor (e.g., in-cylinder pressure sensor, knocking sensor, or air-fuel ratio sensor) provided inside the cylinder 7.

At the time "t2", as denoted by symbol (F) in FIG. 12, the main fuel injection pulse width "Pw-mn" is increased to the associated operating quantity for HCCI combustion. The SCV angle θSCV is reduced to a value for HCCI combustion, as denoted by symbol (G) in FIG. 12.

Next, the operational states of the engine existing when the control of combustion mode switching from SI combustion to HCCI combustion is conducted according to the present embodiment are described below using FIG. 13.

A horizontal axis in FIG. 13 denotes time. A vertical axis of symbol (A) in FIG. 13 denotes the internal EGR rate QEGR. The internal EGR rate QEGR increases as a line indicating this variable goes upward in FIG. 13. A vertical axis of symbol (B) in FIG. 13 denotes the amount of intake air, Qa. The amount of intake air, Qa, increases as a line indicating this variable goes upward in FIG. 13. A vertical axis of symbol (C) in FIG. 13 denotes the in-cylinder temperature Tcyn. The in-cylinder temperature Tcyn increases as a line indicating this variable goes upward in FIG. 13. A vertical axis of symbol (D) in FIG. 13 denotes the self-ignition timing Tmg-SI. The self-ignition timing Tmg-SI advances as a line indicating this variable goes upward in FIG. 13. A vertical axis of symbol (E) in FIG. 13 denotes a self-ignited combustion rate R-Cmb. The self-ignited combustion rate R-Cmb increases as a line indicating this variable goes upward in FIG. 13. A vertical axis of symbol (F) in FIG. 13 denotes the engine torque Te. The engine torque Te increases as a line indicating this variable goes upward in FIG. 13. A vertical axis of symbol (G) in FIG. 13 denotes the maximum increase rate of pressure, Pmax. The maximum increase rate of pressure, Pmax, increases as a line indicating this variable goes upward in FIG. 13.

Solid lines in FIG. 13 indicate a case in which the switching correction of the respective operating quantities, based on the present embodiment, is conducted during switching from SI combustion to HCCI combustion. Dotted lines indicate a case in which the switching correction of the respective operating quantities, based on the present embodiment, is not conducted during combustion switching.

Of the vertical-axis ranges of symbols (D) to (G) in FIG. 13, sections that are each sandwiched between arrows indicate a tolerance.

The case in which the switching correction of the operating quantities, based on the present embodiment, is not conducted is first described below.

At the time "t1", the operating quantities are each switched to the respective settings for implementing HCCI combustion. The internal EGR rate and the amount of air are then correspondingly increased, as denoted by symbols (A) and (B), respectively, of FIG. 13. These increases cause combustion to change from the SI combustion mode firstly to the combined combustion mode in which an increase in SI combustion pressure makes the residual mixture within the combustion chamber self-ignite, and then to the HCCI combustion mode.

During these combustion mode changes, the increase in internal EGR rate reduces the combustion rate and thus the internal combustion of the combustion chamber in FIG. 5 enters the unstable combustion region, so combustion stability decreases during SI combustion and HCCI combustion. However, combustion durations are extended by advancing the ignition timing to ensure combustion stability.

The SI combustion temperature at this time is higher than the combined combustion temperature and the HCCI combustion temperature. As denoted by symbol (C) in FIG. 13, therefore, a high in-cylinder temperature is maintained by an increase in internal EGR temperature and an increase in combustion rate due to a shortage of internal EGR density. Under the high in-cylinder temperature state, the minus overlap period is retained and several cycles are required for the internal EGR temperature and density to become a steady state, so it takes time for the in-cylinder temperature to decrease.

Since the high in-cylinder temperature creates an atmosphere in which self-ignition in both CC and HCCI combustion modes can be easily executed, the self-ignition timing advances as denoted by a dotted line of symbol (D) in FIG. 13, and the self-ignited combustion rate increases as denoted by a dotted line of symbol (E) in FIG. 13. This results in increased engine torque and hence in increased torque fluctuations, as denoted by a dotted line of symbol (F) in FIG. 13. In addition, the maximum increase rate of pressure exceeds the tolerance, as denoted by a dotted line of symbol (G) in FIG. 13, and thus, combustion noise increases.

The case in which the switching correction of the operating quantities, based on the present embodiment, is conducted is next described below.

In the present embodiment, during the period for which the high in-cylinder temperature is maintained, that is, during the period from the time "t1" to the time "t2", as denoted by symbol (F) in FIG. 12, the quantity of main fuel injection is reduced to extend a reaction time of the mixture existing until its self-ignition begins, and to delay the combustion rate existing after the self-ignition of the mixture. At the same time, as denoted by symbol (G) in FIG. 12, the SCV angle reduction rate is lessened and the flow intensity of the mixture is reduced. Thus, the reaction time of the mixture existing until its self-ignition has begun is delayed and thus the self-ignition timing is delayed. As a result, an increase in engine torque due to sustention of the high-temperature period inside the combustion chamber, and an increase in the increase rate of pressure can be suppressed. Smooth and silent switching of the combustion mode can be realized by reducing both torque fluctuations and operating noise.

During SI-to-HCCI combustion mode switching according to the present embodiment, if, at a driver's request or for other reasons, the setting of the combustion mode switching flag is changed from ON (=1) to OFF (=0) during the period from the time "t1" to the time "t2", switching to SI combustion is judged to be necessary, in which case, the operating quantities for SI combustion are set as target operating quantities by the combustion mode selector 27 to implement SI combustion. It should be noted that the description associated with the above is not illustrated in the figure.

Effectiveness of the HCCI internal-combustion engine control apparatus according to the present embodiment is next described below using FIGS. 14 and 15.

Figure 14:
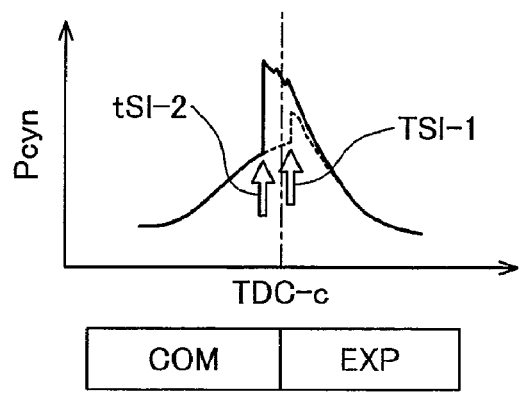
FIG. 14 is an explanatory diagram of an in-cylinder pressure obtained during advanced self-ignition timing.
Figure 15A:
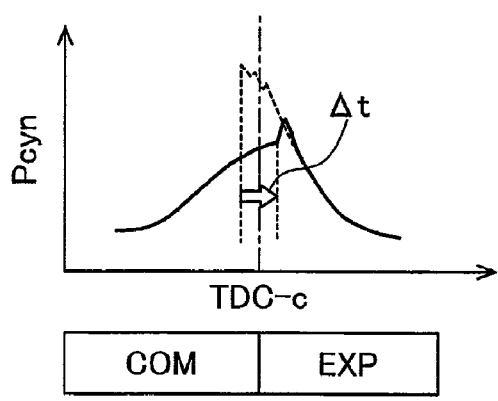
FIGS. 15A and 15B are explanatory diagrams of an in-cylinder pressure obtained during control with the control apparatus of the HCCI internal-combustion engine according to the first embodiment of the present invention.
Figure 15B:
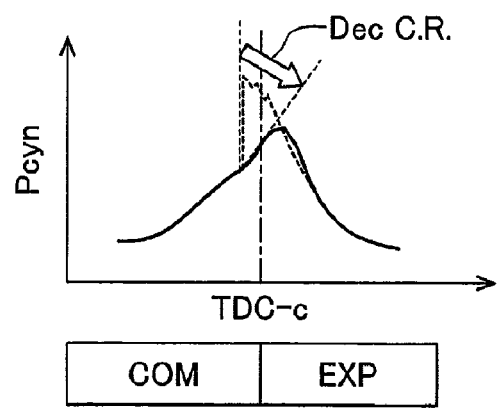

FIG. 14 is an explanatory diagram of an in-cylinder pressure obtained during advanced self-ignition timing. FIGS. 15A and 15B are explanatory diagrams of an in-cylinder pressure obtained during control with the HCCI internal-combustion engine control apparatus according to the first embodiment of the present invention.

A horizontal axis in FIG. 14 denotes time. The compression stroke COM, the expansion stroke EXP, and a compression top dead center TDC-cm are plotted on the horizontal axis. Also, a vertical axis denotes the internal pressure of the cylinder, Pcyn.

A dotted line in FIG. 14 denotes the internal pressure of the cylinder, Pcyn, that is achieved when the self-ignition timing of combined combustion or HCCI combustion in a steady state is "tSI-1" shown in the figure.

In contrast to the above, a solid line in FIG. 14 denotes the internal pressure of the cylinder, Pcyn, that is achieved when self-ignition is started at time "tSI-2" by advancement of the self-ignition timing. The self-ignition timing is advanced by acceleration of chemical reactions, associated with the increase in internal EGR temperature (in-cylinder temperature) due to the difference in combustion temperature, and by the increase in combustion rate due to the shortage of the internal EGR density during combined combustion or HCCI combustion. The advancement of the self-ignition timing abruptly increases the in-cylinder pressure, hence increasing combustion noise.

In contrast to the above, FIGS. 15A and 15B indicate the internal pressure of the cylinder, Pcyn, that is achieved during combined combustion when combustion mode switching is controlled with the switching correction quantities added to the operating quantities for HCCI combustion. A horizontal axis in FIGS. 15A and 15B also denotes time. The compression stroke COM, the expansion stroke EXP, and the compression top dead center TDC-cm are plotted on the horizontal axis. Also, a vertical axis denotes the internal pressure of the cylinder, Pcyn.

Retardation effects of the self-ignition timing are described below with reference to FIG. 15A.

As described per FIGS. 12 and 13, in the present embodiment, as denoted by symbol (F) in FIG. 12, during the "t1" to "t2" period for which the high in-cylinder temperature is maintained, the quantity of main fuel injection is reduced to extend the reaction time of the mixture existing until its self-ignition begins, and to delay the combustion rate existing after the self-ignition of the mixture.

Thus, for example, even if, as shown in FIG. 14, the self-ignition occurs at the time "tSI-2", the self-ignition timing can be changed to time "tSI-3" by delaying the self-ignition timing by "Δt". If the ignition timing is synchronous with the time "tSI-2" and the self-ignition occurs in the compression stroke COM conducted before the compression top dead center TDC-cm is reached, a pressure rise due to an explosion arising from the self-ignition occurs during an increase in the internal pressure of the cylinder, Pcyn, thus resulting in Pcyn being further increased. Meanwhile, If the ignition timing is synchronous with the time "tSI-3" and the self-ignition occurs in the expansion stroke EXP conducted after the compression top dead center TDC-cm has been reached, the pressure rise due to the explosion arising from the self-ignition occurs during a decrease in Pcyn, thus resulting in Pcyn being reduced in increase rate.

Since the increases in the pressure increase rate of the engine can be suppressed, operating noise can be reduced and the combustion mode switched smoothly and silently.

Reduction effects of the combustion rate are described below with reference to FIG. 15B.

As described in FIGS. 12 and 13, in the present embodiment, as denoted by symbol (G) in FIG. 12, the flow intensity level of the mixture within the cylinder is reduced by reducing the decrement in SCV angle to delay a start of the reaction of the mixture existing until its self-ignition begins, and thus to delay the self-ignition timing. The resulting decrease in combustion rate causes transition from the state denoted by a broken line in FIG. 15B, to the state denoted by a solid line, so the internal pressure of the cylinder, Pcyn, can have its increase rate reduced.

Since the increases in the pressure increase rate of the engine can be suppressed, operating noise can be reduced and the combustion mode switched smoothly and silently.

As described above, for reduced operating noise, the present embodiment employs the method of reducing the after-self-ignition combustion rate by reducing the quantity of main fuel injection, and the method of delaying the self-ignition timing of the mixture existing until its self-ignition begins, by reducing the decrement in SCV angle. Operating noise can be reduced just by employing either the method of reducing the quantity of main fuel injection (i.e., reducing the combustion rate) or the method of reducing the decrement in SCV angle (i.e., delaying the self-ignition timing). However, operating noise can be further reduced by adopting both methods.

As set forth above, according to the present embodiment, when the combustion mode is switched from SI combustion to HCCI combustion, fluctuations in torque can be reduced and at the same time, combustion noise can be reduced.

Next, control by a control apparatus for controlling a homogeneous charge compression-ignited internal-combustion engine according to a second embodiment of the present invention will be described using FIG. 16.

A configuration of an automotive gasoline engine system to which is applied the control apparatus that controls a homogeneous charge compression-ignited internal-combustion engine according to the present embodiment is substantially the same as the system configuration shown in FIG. 1. In addition, a configuration of the control apparatus which controls a homogeneous charge compression-ignited internal-combustion engine according to the present embodiment is substantially the same as the apparatus configuration shown in FIG. 2. Furthermore, a combustion mode switching circuit composition of the control apparatus which controls a homogeneous charge compression-ignited internal-combustion engine according to the present embodiment is substantially the same as the circuit composition shown in FIG. 3.

In terms of data types or items, however, the switching correction quantities that the switching correction quantity arithmetic unit 28b in the combustion mode switching corrector 28 calculates differ from the calculations occurring in FIG. 3. These differences are described below using FIG. 16.

Figure 16:
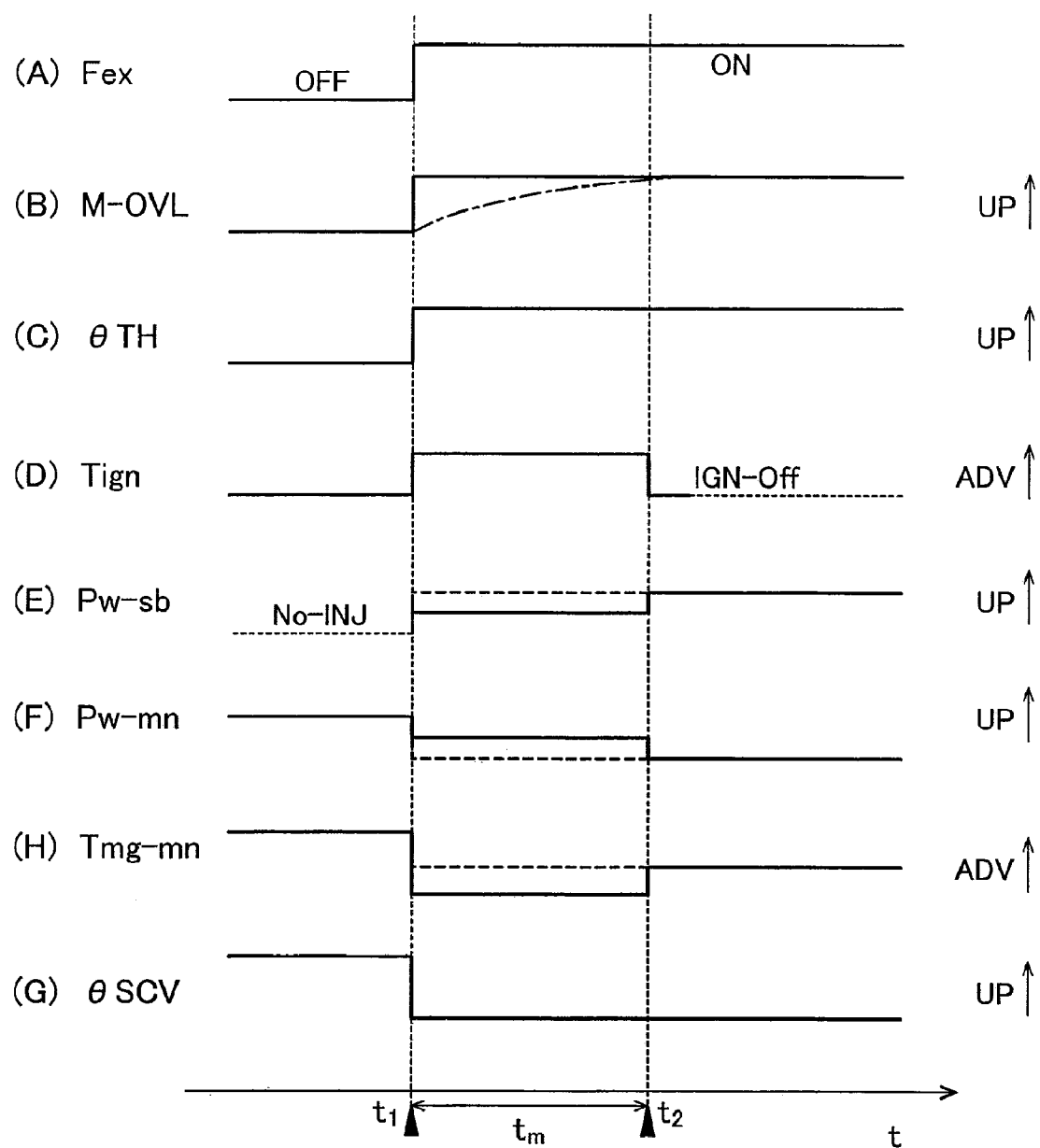
FIG. 16 is a flowchart that shows control by a control apparatus for controlling a homogeneous charge compression-ignited internal-combustion engine according to a second embodiment of the present invention.

FIG. 16 is a flowchart that shows the control by the control apparatus for controlling a homogeneous charge compression-ignited internal-combustion engine according to the second embodiment of the present invention.

A horizontal axis in FIG. 16 denotes time. Vertical axes of symbols (A) to (G) in FIG. 16 denote the same as indicated by the vertical axes of symbols (A) to (G) in FIG. 12. A vertical axis of symbol (H) in FIG. 16 denotes the main fuel injection timing "Tmg-mn" described in FIGS. 7 and 8. The main fuel injection timing "Tmg-mn" advances as a line indicating this variable goes upward in the figures.

At the horizontal axis of FIG. 16, time "t1" indicates the time when combustion mode switching from spark-ignited (SI) combustion to homogeneous charge compression-ignited (HCCI) combustion is started. Time "t2" indicates the time when the addition of switching correction quantities that applies combustion mode switching control in the present embodiment is completed. Before the time "t1", therefore, the engine is burning the mixture in the SI combustion mode shown in FIG. 6. After the time "t2", the engine is burning the mixture in the HCCI combustion mode shown in FIG. 7. From the time "t1" to the time "t2", the combustion mode is HCCI combustion, but since the operating quantities obtained by adding the switching correction quantities output from the combustion mode switching corrector of FIG. 3 to the HCCI combustion-use operating quantities are adopted as target operating quantities, the engine is burning the mixture in the combined combustion mode shown in FIG. 8.

During the period from the time "t1" to the time "t2", dotted lines of the items denoted by symbols (E), (F) and (H) in FIG. 16 indicate the respective operating quantities used if the switching correction quantities are not added thereto. Solid lines indicate the respective operating quantities used when the switching correction quantities are added to the HCCI combustion-use operating quantities. During the period from the time "t1" to the time "t2", a solid line of the item denoted by symbol (B) in FIG. 16 indicates a target value of the minus overlap period M-OVL. A broken line indicates an actual minus overlap period M-OVL. That is to say, at the time "t1", even if a command is output that increases the target value of the minus overlap period M-OVL stepwise as indicated by the solid line, since there is a response delay until the variable valve 5 actually starts operating, the actual minus overlap period M-OVL increases with a first-order lag, as indicated by the broken line.

Details of the control executed if the switching correction of the operating quantities, based on the present embodiment, is not conducted are substantially the same as the control details described in FIG. 12.

A case in which the switching correction of the operating quantities, based on the present embodiment, is conducted is next described below.

At the time "t1", if, as denoted by symbol (A) in FIG. 16, the combustion mode switching discriminator 21 judges HCCI combustion to be executable, the combustion mode switching flag "Fex" is set to ON (=1) and the combustion mode is switched from SI combustion to HCCI combustion. Setting of the combustion mode switching flag "Fex" to ON (=1) increases the minus overlap period M-OVL and the throttle angle θTH, as denoted by symbols (B) and (C), respectively, of FIG. 16.

As denoted by symbol (D) in FIG. 16, adding an associated switching correction quantity advances the ignition timing TIGN relative to the ignition timing defined by the corresponding operating quantity for SI combustion or HCCI combustion. It is assumed that the switching correction quantity adding period is from the time "t1" to the time "t2", wherein "t2" is an elapsed time of "tm" from the time "t1". The ignition signal is turned off after HCCI combustion has been successfully implemented.

As denoted by symbol (E) in FIG. 16, subsidiary fuel injection is started at the time "t1" at the subsidiary fuel injection quantity and subsidiary fuel injection pulse width "Pw-sb" reduced below those required for the implementation of HCCI combustion.

Additionally, as denoted by symbol (F) in FIG. 16, upon the start of subsidiary fuel injection, the main fuel injection pulse width "Pw-mn" is increased above the associated operating quantity for HCCI combustion, only during the period from the time "t1" to the time "t2".

Furthermore, as denoted by symbol (H) in FIG. 16, the main fuel injection timing "Tmg-mn" is delayed with respect to the associated operating quantity for HCCI combustion, only during the period from the time "t1" to the time "t2".

Moreover, as denoted by symbol (G) in FIG. 16, the SCV angle θSCV is set to be equal to the associated operating quantity for HCCI combustion.

At the time "t2", as denoted by symbol (E) in FIG. 16, the subsidiary fuel injection pulse width "Pw-sb" increases to the associated operating quantity for HCCI combustion. As denoted by symbol (F) in FIG. 16, the main fuel injection pulse width "Pw-mn" decreases to the associated operating quantity for HCCI combustion. As denoted by symbol (H) in FIG. 16, the main fuel injection timing "Tmg-mn" advances to the associated injection timing for HCCI combustion.

The advancement of the ignition timing in the present embodiment suppresses combustion instability during combustion mode switching.

Fuel injection is quantitatively adjusted to change the injection rate between the quantity of main fuel injection and the quantity of subsidiary fuel injection. After the rate of the subsidiary fuel injection quantity has been reduced, generation volumes of chemical species prone to ignition if the fuel becomes reformed at high temperature can be lessened by reducing the quantity of fuel injected into the internal EGR components remaining inside the combustion chamber during the minus overlap period. The self-ignition timing is thus delayed. At this time, in order to increase the quantity of main fuel injection, the self-ignition timing can be delayed without changing combustion efficiency, since a total quantity of fuel injection in one cycle is invariable.

In addition, delaying the main fuel injection timing retards the starting time of reaction of the mixture, and this retardation, in turn, results in delayed starting time of self-ignition. Thanks to these advantageous effects of the switching correction quantities, the maximum increase rate of pressure can be reduced by delaying the self-ignition timing, and this delay makes combustion noise increases suppressible during combustion mode switching.

As described above, for reduced operating noise, the present embodiment employs the method of delaying the self-ignition timing by reducing the rate of the subsidiary fuel injection quantity with respect to the total quantity of fuel injection, and the method of delaying the self-ignition timing by delaying the main fuel injection timing. Operating noise can be reduced just by employing either the method of reducing the quantity of subsidiary fuel injection (i.e., delaying the self-ignition timing) or the method of delaying the main fuel injection timing (i.e., delaying the self-ignition timing). However, operating noise can be further reduced by adopting both methods.

As set forth above, according to the present embodiment, when the combustion mode is switched from SI combustion to HCCI combustion, fluctuations in torque can be reduced and at the same time, combustion noise can be reduced.

Next, control by a control apparatus for controlling a homogeneous charge compression-ignited internal-combustion engine according to a third embodiment of the present invention will be described using FIG. 17.

A configuration of an automotive gasoline engine system to which is applied the control apparatus that controls a homogeneous charge compression-ignited internal-combustion engine according to the present embodiment is substantially the same as the system configuration shown in FIG. 1. In addition, a configuration of the control apparatus which controls a homogeneous charge compression-ignited internal-combustion engine according to the present embodiment is substantially the same as the apparatus configuration shown in FIG. 2. Furthermore, a combustion mode switching circuit composition of the control apparatus which controls a homogeneous charge compression-ignited internal-combustion engine according to the present embodiment is substantially the same as the circuit composition shown in FIG. 3.

In terms of data types or items, however, the switching correction quantities that the switching correction quantity arithmetic unit 28*b* in the combustion mode switching corrector 28 calculates differ from the calculations occurring in FIG. 3. These differences are described below using FIG. 17.

Figure 17:
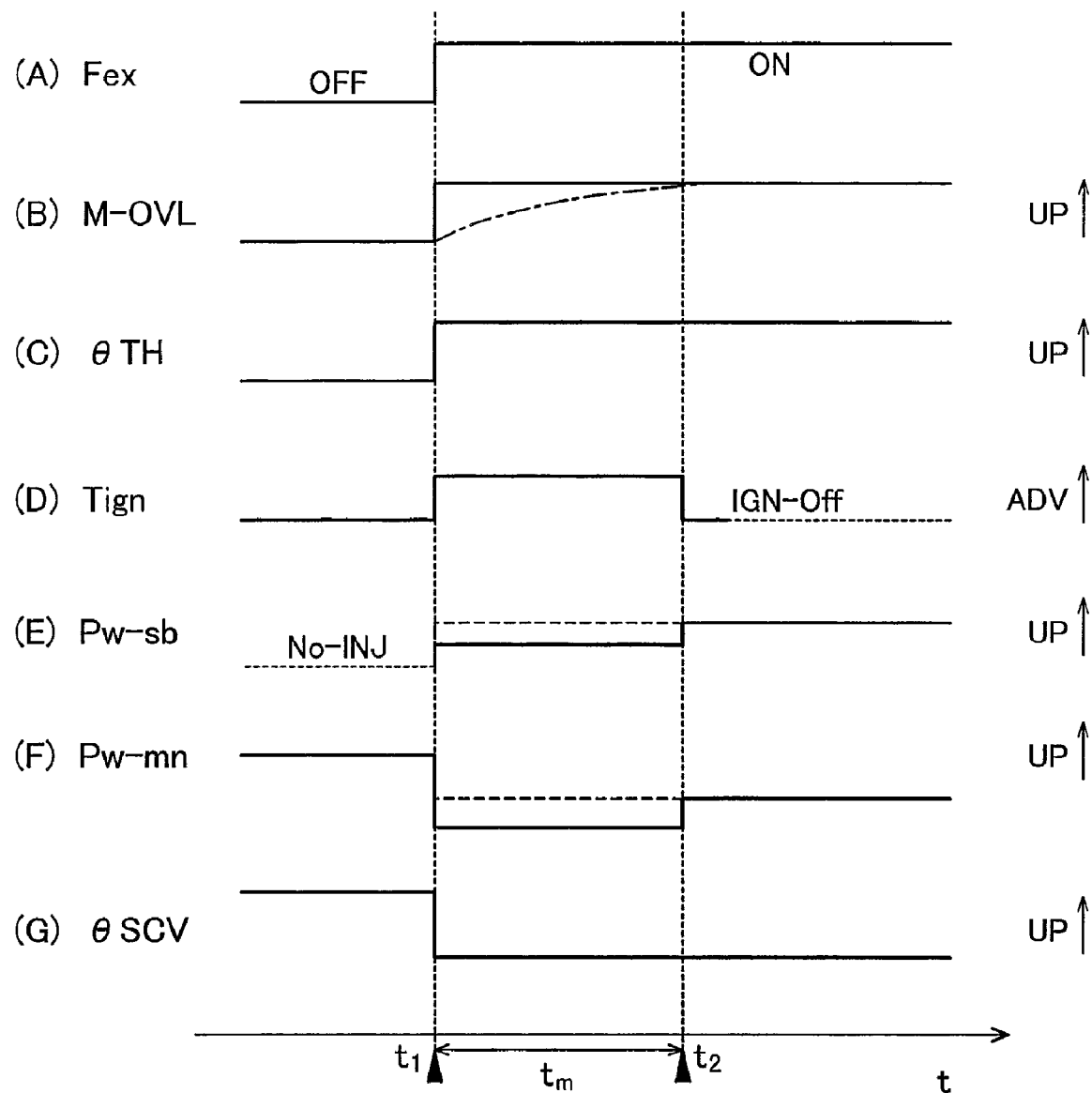
FIG. 17 is a flowchart that shows control by a control apparatus for controlling a homogeneous charge compression-ignited internal-combustion engine according to a third embodiment of the present invention.

FIG. 17 is a flowchart that shows the control by the control apparatus for controlling a homogeneous charge compression-ignited internal-combustion engine according to the third embodiment of the present invention.

A horizontal axis in FIG. 17 denotes time. Vertical axes of symbols (A) to (G) in FIG. 17 denote the same as indicated by the vertical axes of symbols (A) to (G) in FIG. 12.

At the horizontal axis of FIG. 17, time "t1" indicates the time when combustion mode switching from spark-ignited (SI) combustion to homogeneous charge compression-ignited (HCCI) combustion is started. Time "t2" indicates the time when the addition of switching correction quantities that applies combustion mode switching control in the present embodiment is completed. Before the time "t1", therefore, the engine is burning the mixture in the SI combustion mode shown in FIG. 6. After the time "t2", the engine is burning the mixture in the HCCI combustion mode shown in FIG. 7. From the time "t1" to the time "t2", the combustion mode is HCCI combustion, but since the operating quantities obtained by adding the switching correction quantities output from the combustion mode switching corrector of FIG. 3 to the HCCI combustion-use operating quantities are adopted as target operating quantities, the engine is burning the mixture in the combined combustion mode shown in FIG. 8.

During the period from the time "t1" to the time "t2", dotted lines of the items denoted by symbols (E) and (F) in FIG. 17 indicate the respective operating quantities used if the switching correction quantities are not added thereto. Solid lines indicate the respective operating quantities used when the switching correction quantities are added to the HCCI combustion-use operating quantities.

During the period from the time "t1" to the time "t2", a solid line of the item denoted by symbol (B) in FIG. 17 indicates a target value of the minus overlap period M-OVL.

A broken line indicates an actual minus overlap period M-OVL. That is to say, at the time "t1", even if a command is output that increases the target value of the minus overlap period M-OVL stepwise as indicated by the solid line, since there is a response delay until the variable valve 5 actually starts operating, the actual minus overlap period M-OVL increases with a first-order lag, as indicated by the broken line.

Details of the control executed if the switching correction of the operating quantities, based on the present embodiment, is not conducted are substantially the same as the control details described in FIG. 12.

A case in which the switching correction of the operating quantities, based on the present embodiment, is conducted is next described below.

At the time "t1", if, as denoted by symbol (A) in FIG. 17, the combustion mode switching discriminator 21 judges HCCI combustion to be executable, the combustion mode switching flag "Fex" is set to ON (=1) and the combustion mode is switched from SI combustion to HCCI combustion. Setting of the combustion mode switching flag "Fex" to ON (=1) increases the minus overlap period M-OVL and the throttle angle θTH, as denoted by symbols (B) and (C), respectively, of FIG. 17.

As denoted by symbol (D) in FIG. 17, adding an associated switching correction quantity advances the ignition timing TIGN relative to the ignition timing defined by the corresponding operating quantity for SI combustion or HCCI combustion. It is assumed that the switching correction quantity adding period is from the time "t1" to the time "t2", wherein "t2" is an elapsed time of "tm" from the time "t1". The ignition signal is turned off after HCCI combustion has been successfully implemented.

As denoted by symbol (E) in FIG. 17, subsidiary fuel injection is started at the time "t1" at the subsidiary fuel injection quantity and subsidiary fuel injection pulse width "Pw-sb" reduced below those required for the implementation of HCCI combustion.

Additionally, as denoted by symbol (F) in FIG. 17, upon the start of subsidiary fuel injection, the main fuel injection pulse width "Pw-mn" is reduced below the associated operating quantity for HCCI combustion, only during the period from the time "t1" to the time "t2".

Furthermore, as denoted by symbol (G) in FIG. 17, the SCV angle θSCV is set to be equal to the associated operating quantity for HCCI combustion.

At the time "t2", as denoted by symbol (E) in FIG. 17, the subsidiary fuel injection pulse width "Pw-sb" increases to the associated operating quantity for HCCI combustion. As denoted by symbol (F) in FIG. 17, the main fuel injection pulse width "Pw-mn" decreases to the associated operating quantity for HCCI combustion.

Advancement of the ignition timing in the present embodiment suppresses combustion instability during combustion mode switching.

For quantitative adjustment of fuel injection, since the quantity of subsidiary fuel injection is reduced, generation volumes of chemical species prone to ignition if the fuel becomes reformed at high temperature can be lessened by reducing the quantity of fuel injected into the internal EGR components remaining inside the combustion chamber during the minus overlap period. Self-ignition timing is thus delayed. Additionally, the quantity of main fuel injection is reduced. This extends the reaction time of the mixture existing until its self-ignition begins, and delays the combustion rate existing after the self-ignition.

As described above, for reduced operating noise, the present embodiment employs the method of delaying the self-ignition timing by reducing the quantity of subsidiary fuel injection, and the method of slowing down the reaction of the mixture existing after the self-ignition.

As set forth above, according to the present embodiment, when the combustion mode is switched from SI combustion to HCCI combustion, fluctuations in torque can be reduced and at the same time, combustion noise can be reduced.

Next, control by a control apparatus for controlling a homogeneous charge compression-ignited internal-combustion engine according to a fourth embodiment of the present invention will be described using FIG. 18.

A configuration of an automotive gasoline engine system to which is applied the control apparatus that controls a homogeneous charge compression-ignited internal-combustion engine according to the present embodiment is substantially the same as the system configuration shown in FIG. 1. In addition, a configuration of the control apparatus which controls a homogeneous charge compression-ignited internal-combustion engine according to the present embodiment is substantially the same as the apparatus configuration shown in FIG. 2. Furthermore, a combustion mode switching circuit composition of the control apparatus which controls a homogeneous charge compression-ignited internal-combustion engine according to the present embodiment is substantially the same as the circuit composition shown in FIG. 3.

In terms of data types or items, however, the switching correction quantities that the switching correction quantity arithmetic unit 28b in the combustion mode switching corrector 28 calculates differ from the calculations occurring in FIG. 3. These differences are described below using FIG. 18.

Figure 18:
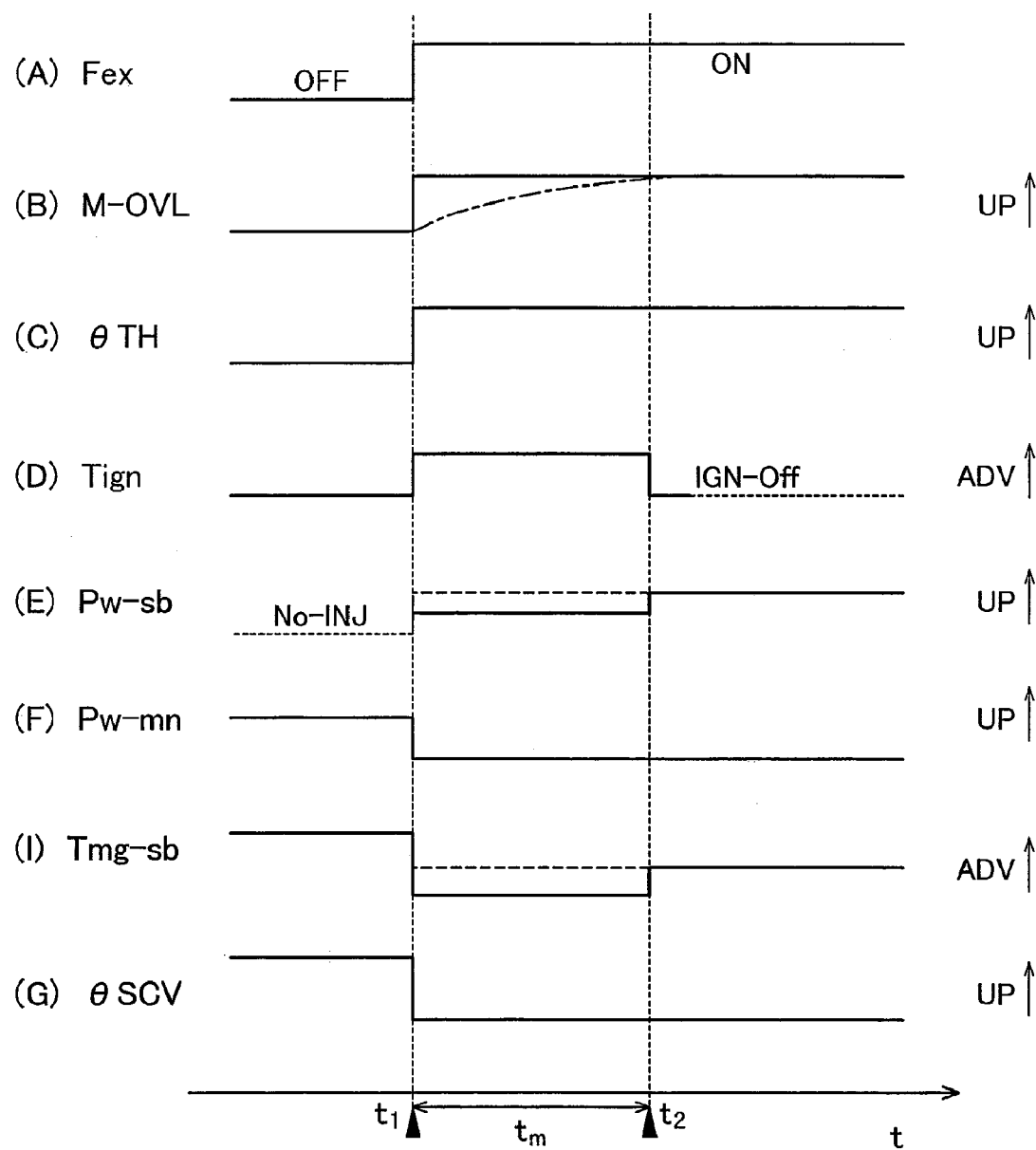
FIG. 18 is a flowchart that shows control by a control apparatus for controlling a homogeneous charge compression-ignited internal-combustion engine according to a fourth embodiment of the present invention.

FIG. 18 is a flowchart that shows the control by the control apparatus for controlling a homogeneous charge compression-ignited internal-combustion engine according to the fourth embodiment of the present invention.

A horizontal axis in FIG. 18 denotes time. Vertical axes of symbols (A) to (G) in FIG. 18 denote the same as indicated by the vertical axes of symbols (A) to (G) in FIG. 12. A vertical axis of symbol (I) in FIG. 18 denotes the subsidiary fuel injection timing "Tmg-sb" described in FIGS. 7 and 8. The subsidiary fuel injection timing "Tmg-sb" advances as a line indicating this variable goes upward in the figures.

At the horizontal axis of FIG. 18, time "t1" indicates the time when combustion mode switching from spark-ignited (SI) combustion to homogeneous charge compression-ignited (HCCI) combustion is started. Time "t2" indicates the time when the addition of switching correction quantities that applies combustion mode switching control in the present embodiment is completed. Before the time "t1", therefore, the engine is burning the mixture in the SI combustion mode shown in FIG. 6. After the time "t2", the engine is burning the mixture in the HCCI combustion mode shown in FIG. 7. From the time "t1" to the time "t2", the combustion mode is HCCI combustion, but since the operating quantities obtained by adding the switching correction quantities output from the combustion mode switching corrector of FIG. 3 to the HCCI combustion-use operating quantities are adopted as target operating quantities, the engine is burning the mixture in the combined combustion mode shown in FIG. 8.

During the period from the time "t1" to the time "t2", dotted lines of the items denoted by symbols (E), (F), and (H) in FIG. 18 indicate the respective operating quantities used if the switching correction quantities are not added thereto. Solid lines indicate the respective operating quantities used when the switching correction quantities are added to the HCCI combustion-use operating quantities in the present embodiment.

During the period from the time "t1" to the time "t2", a solid line of the item denoted by symbol (B) in FIG. 18 indicates a target value of the minus overlap period M-OVL. A broken line indicates an actual minus overlap period M-OVL. That is to say, at the time "t1", even if a command is output that increases the target value of the minus overlap period M-OVL stepwise as indicated by the solid line, since there is a response delay until the variable valve 5 actually starts operating, the actual minus overlap period M-OVL increases with a first-order lag, as indicated by the broken line.

Details of the control executed if the switching correction of the operating quantities, based on the present embodiment, is not conducted are substantially the same as the control details described in FIG. 12.

A case in which the switching correction of the operating quantities, based on the present embodiment, is conducted is next described below.

At the time "t1", if, as denoted by symbol (A) in FIG. 18, the combustion mode switching discriminator 21 judges HCCI combustion to be executable, the combustion mode switching flag "Fex" is set to ON (=1) and the combustion mode is switched from SI combustion to HCCI combustion. Setting of the combustion mode switching flag "Fex" to ON (=1) increases the minus overlap period M-OVL and the throttle angle θTH, as denoted by symbols (B) and (C), respectively, of FIG. 18.

As denoted by symbol (D) in FIG. 18, adding an associated switching correction quantity advances the ignition timing TIGN relative to the ignition timing defined by the corresponding operating quantity for SI combustion or HCCI combustion. It is assumed that the switching correction quantity adding period is from the time "t1" to the time "t2", wherein "t2" is an elapsed time of "tm" from the time "t1". The ignition signal is turned off after HCCI combustion has been successfully implemented.

As denoted by symbol (E) in FIG. 18, subsidiary fuel injection is started at the time "t1" at the subsidiary fuel injection quantity and subsidiary fuel injection pulse width "Pw-sb" reduced below those required for the implementation of HCCI combustion.

Additionally, as denoted by symbol (I) in FIG. 18, the subsidiary fuel injection timing "Tmg-sb" is delayed with respect to the associated operating quantity for HCCI combustion, only during the period from the time "t1" to the time "t2".

Furthermore, as denoted by symbol (G) in FIG. 18, the SCV angle θSCV is set to be equal to the associated operating quantity for HCCI combustion.

At the time "t2", as denoted by symbol (E) in FIG. 18, the subsidiary fuel injection pulse width "Pw-sb" increases to the associated operating quantity for HCCI combustion. As denoted by symbol (I) in FIG. 18, the subsidiary fuel injection timing "Tmg-sb" advances to the associated injection timing for HCCI combustion.

Advancement of the ignition timing suppresses combustion instability during combustion mode switching.

For fuel injection adjustment, additions on switching correction quantities are conducted to reduce the quantity of subsidiary fuel injection during the minus overlap period and delay the subsidiary fuel injection timing. Reduction in the quantity of subsidiary fuel injection reduces generation volumes of chemical species prone to ignition during the minus overlap period, and delays the self-ignition timing of the mixture. In addition, since the subsidiary fuel injection timing is delayed to a period from an arrival of the piston at an exhaust top dead center to a opening time of the intake valve, a period for which the fuel injected during the minus overlap period is exposed to a high-temperature atmosphere is shortened for reduced generation volumes of ignition-prone chemical species and hence for delayed self-ignition timing. Thanks to these advantageous effects of the switching correction quantities, the maximum increase rate of pressure can be reduced by delaying the self-ignition timing, and this delay makes combustion noise increases suppressible during combustion mode switching.

As described above, for reduced operating noise, the present embodiment employs the method of delaying the self-ignition timing by reducing the quantity of subsidiary fuel injection, and the method of delaying the self-ignition timing by delaying the subsidiary fuel injection timing. operating noise can be reduced just by employing either the method of reducing the quantity of subsidiary fuel injection (i.e., delaying the self-ignition timing) or the method of delaying the subsidiary fuel injection timing (i.e., delaying the self-ignition timing). However, operating noise can be further reduced by adopting both methods.

As set forth above, according to the present embodiment, when the combustion mode is switched from SI combustion to HCCI combustion, fluctuations in torque can be reduced and at the same time, combustion noise can be reduced.

Next, control by a control apparatus for controlling a homogeneous charge compression-ignited internal-combustion engine according to a fifth embodiment of the present invention will be described using FIG. 19.

A configuration of an automotive gasoline engine system to which is applied the control apparatus that controls a homogeneous charge compression-ignited internal-combustion engine according to the present embodiment is substantially the same as the system configuration shown in FIG. 1. In addition, a configuration of the control apparatus which controls a homogeneous charge compression-ignited internal-combustion engine according to the present embodiment is substantially the same as the apparatus configuration shown in FIG. 2. Furthermore, a combustion mode switching circuit composition of the control apparatus which controls a homogeneous charge compression-ignited internal-combustion engine according to the present embodiment is substantially the same as the circuit composition shown in FIG. 3.

In terms of data types or items, however, the switching correction quantities that the switching correction quantity arithmetic unit 28b in the combustion mode switching corrector 28 calculates differ from the calculations occurring in FIG. 3. These differences are described below using FIG. 19.

Figure 19:
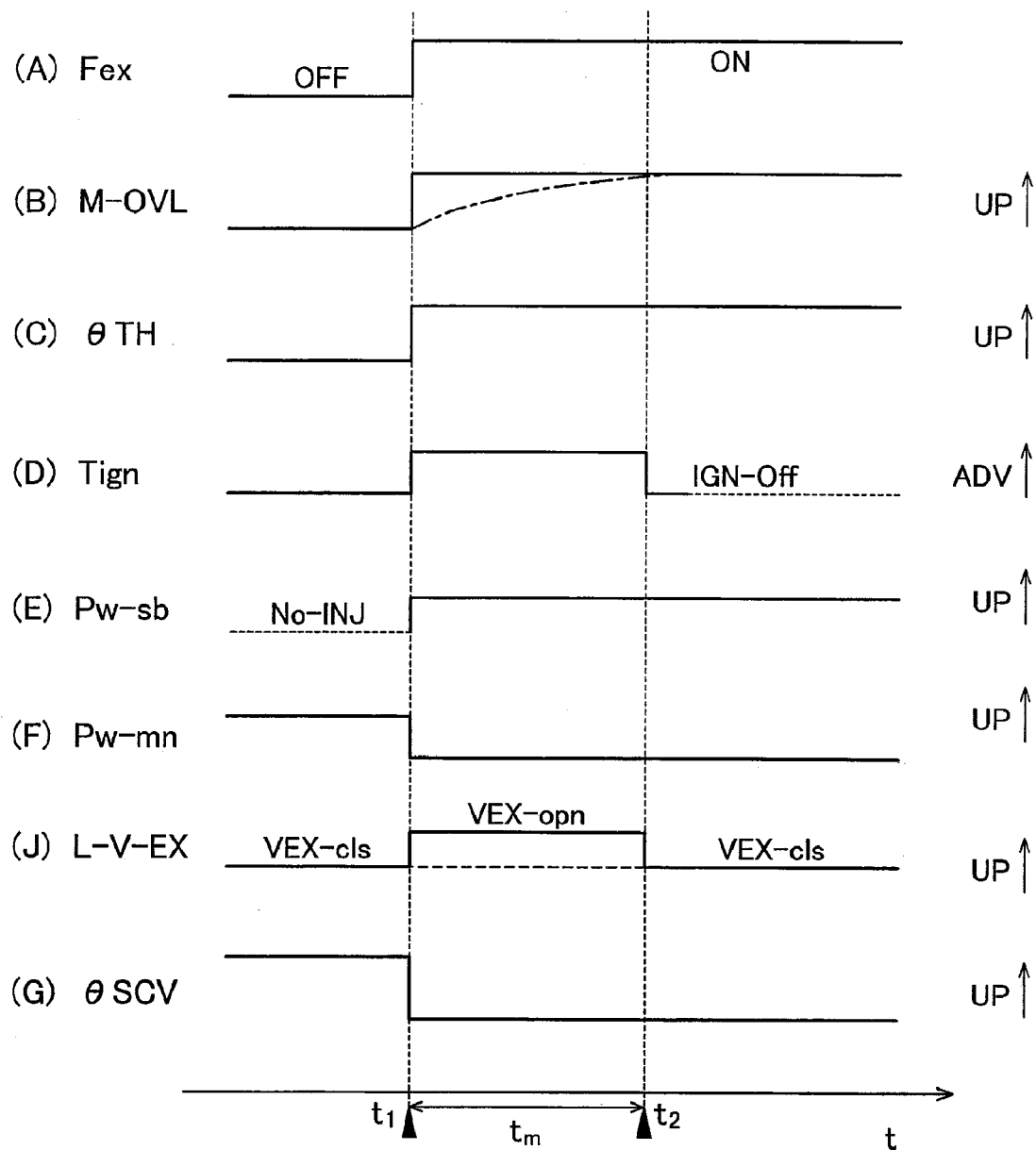
FIG. 19 is a flowchart that shows control by a control apparatus for controlling a homogeneous charge compression-ignited internal-combustion engine according to a fifth embodiment of the present invention.

FIG. 19 is a flowchart that shows the control by the control apparatus for controlling a homogeneous charge compression-ignited internal-combustion engine according to the fifth embodiment of the present invention.

A horizontal axis in FIG. 19 denotes time. Vertical axes of symbols (A) to (G) in FIG. 19 denote the same as indicated by the vertical axes of symbols (A) to (G) in FIG. 12. A vertical axis of symbol (J) in FIG. 19 denotes a lift LV-EX of the exhaust valve in the intake stroke described in FIGS. 7 and 8. The exhaust valve lift LV-EX increases as a line indicating this variable goes upward in the figures.

At the horizontal axis of FIG. 19, time "t1" indicates the time when combustion mode switching from spark-ignited (SI) combustion to homogeneous charge compression-ignited (HCCI) combustion is started. Time "t2" indicates the time when the addition of switching correction quantities that applies combustion mode switching control in the present embodiment is completed. Before the time "t1", therefore, the engine is burning the mixture in the SI combustion mode shown in FIG. 6. After the time "t2", the engine is burning the mixture in the HCCI combustion mode shown in FIG. 7. From the time "t1" to the time "t2", the combustion mode is HCCI combustion, but since the operating quantities obtained by adding the switching correction quantities output from the combustion mode switching corrector of FIG. 3 to the HCCI combustion-use operating quantities are adopted as target operating quantities, the engine is burning the mixture in the combined combustion mode shown in FIG. 8.

During the period from the time "t1" to the time "t2", a dotted line of the item denoted by symbol (J) in FIG. 19 indicates the associated operating quantity used if the associated switching correction quantity is not added thereto. A solid line indicates the associated operating quantity used when the associated switching correction quantity is added to the HCCI combustion-use operating quantities in the present embodiment.

During the period from the time "t1" to the time "t2", a solid line of the item denoted by symbol (B) in FIG. 19 indicates a target value of the minus overlap period M-OVL. A broken line indicates an actual minus overlap period M-OVL. That is to say, at the time "t1", even if a command is output that increases the target value of the minus overlap period M-OVL stepwise as indicated by the solid line, since there is a response delay until the variable valve 5 actually starts operating, the actual minus overlap period M-OVL increases with a first-order lag, as indicated by the broken line.

Details of the control executed if the switching correction of the operating quantities, based on the present embodiment, is not conducted are substantially the same as the control details described in FIG. 12. However, although this was not described per FIG. 12, if, as denoted by the dotted line of symbol (J) in FIG. 19, the exhaust valve lift LV-EX is not subjected to switching correction, LV-EX remains 0, that is, the exhaust valve remains closed, in the intake stroke.

A case in which the switching correction of the operating quantities, based on the present embodiment, is conducted is next described below.

At the time "t1", if, as denoted by symbol (A) in FIG. 19, the combustion mode switching discriminator 21 judges HCCI combustion to be executable, the combustion mode switching flag "Fex" is set to ON (=1) and the combustion mode is switched from SI combustion to HCCI combustion. Setting of the combustion mode switching flag "Fex" to ON (=1) increases the minus overlap period M-OVL and the throttle angle θTH, as denoted by symbols (B) and (C), respectively, of FIG. 19.

As denoted by symbol (D) in FIG. 19, adding an associated switching correction quantity advances the ignition timing TIGN relative to the ignition timing defined by the corresponding operating quantity for SI combustion or HCCI combustion. It is assumed that the switching correction quantity adding period is from the time "t1" to the time "t2", wherein "t2" is an elapsed time of "tm" from the time "t1". The ignition signal is turned off after HCCI combustion has been successfully implemented.

As denoted by symbol (F) in FIG. 19, subsidiary fuel injection pulse width "Pw-sb" is adjusted to the quantity of subsidiary fuel injection appropriate for executing HCCI combustion, and the injection is started at the time "t1".

A denoted by symbol (F) in FIG. 19, the main fuel injection pulse width "Pw-mn" is set to match the quantity of subsidiary fuel injection for executing HCCI combustion.

Additionally, as denoted by symbol (J) in FIG. 19, the exhaust valve lift LV-EX is increased. That is to say, the exhaust valve is opened during an opening period of the intake valve in the intake stroke, and an opening period of the exhaust valve is shorter than that of the intake valve. It is assumed that the exhaust valve 5a has a mechanism such as magnetic valve that allows the valve to be opened and closed in any timing during the engine cycle.

At the time "t2", as denoted by symbol (J) in FIG. 19, the exhaust valve lift LV-EX is cleared to 0 and the exhaust valve is closed.

Advancement of the ignition timing in the present embodiment suppresses combustion instability during combustion mode switching.

In addition, the opening period of the exhaust valve is provided in the intake stroke period, such that the exhaust gases can be taken back in during the intake stroke and such that the quantity of internal EGR within the combustion chamber can be increased. This increase in EGR increases substances that obstruct the reaction of the mixture, reduces the combustion rate existing after self-ignition, reduces the maxim increase rate of pressure, and thus lessens combustion noise.

As described above, for reduced operating noise, the present embodiment employs the method of reducing the combustion rate by opening the exhaust valve during the intake stroke.

As set forth above, according to the present embodiment, when the combustion mode is switched from SI combustion to HCCI combustion, fluctuations in torque can be reduced and at the same time, combustion noise can be reduced.

Embodiments of the present invention have been described above. The invention is not limited to the embodiments and may be changed or modified in various forms during design without deviating from the spirit of the invention that is described in the appended claims.

For example, when the combustion mode switching discriminator 21 judges whether switching between SI combustion or HCCI combustion is possible, the discriminator 21 may, instead of using the required-torque and engine speed sensor output signals only, use at least one of output signals from sensors which detect water temperature, exhaust gas temperature, intake air temperature, or fuel temperature directly or indirectly.

In addition, while the above embodiments execute HCCI combustion by adopting combustion control means based on the control of internal EGR, the invention may employ other means, for example, combustion control based on adjustment of EGR such as external EGR, or combustion control based on control of the intake air temperature, actual compression ratio, or intake pipe pressure. Furthermore, although required values of these variables will be changed according to water temperature, exhaust gas temperature, intake air temperature, or fuel temperature, as well as according to operating conditions, the values predetermined by simulation, test, or experimental results, may be used, or the required values may be updated by learning during operation.

Moreover, while one or two of parameters such as the ignition timing, the quantity of fuel injection, the fuel injection timing, and the SCV angle, are added as the switching correction data used in the above embodiments, two or more of the parameters described in the embodiments may be combined to use in combined form a plurality of switching corrections on the parameters.

Although the switching correction quantity adding period in each embodiment is substantially the same as the correcting or adjusting periods of the ignition timing and other parameters (such as the quantity of fuel injection, the fuel injection timing, and the SCV angle), the invention is not limited to this and the startup and completion timing of each parameter may be adjusted as appropriate.

Besides, although each of the above embodiments assume that the main fuel injection and the subsidiary fuel injection are executed, the invention is not limited to this and the main fuel injection may be repeated a plurality of split times in the minus overlap period or the subsidiary fuel injection may be repeated a plurality of split times in the intake stroke period. In these cases, the injection quantity and injection timing of the main fuel injection and those of the subsidiary fuel injection may be adjusted independently as appropriate. The reaction rate of the mixture can be precisely adjusted by conducting the fuel injection in split operations as described above, such that further retardation of the self-ignition timing and further reduction of the combustion rate existing after the self-ignition can be accomplished.

In addition, although the intensity of flow of the mixture formed in the combustion chamber is controlled by the swirl control valve 15 in the above embodiments, the invention is not limited to this and the above flow may be adjusted according to a particular shape of the intake pipe 6 provided upstream with respect to the intake valve 5a or may be adjusted by operating nonuniformly the valve lifts or opening/closing timing of a plurality of valves provided in or at one cylinder.

While the embodiments relate to a gasoline engine fueled by gasoline, the invention can be applied not only to gasoline, but also in independent use of other alcohol-containing fuels (e.g., bio-ethanol) applicable to other internal-combustion engines, or in combined use of such an alcohol-containing fuel with gasoline. In these cases, the quantity of fuel injection and the fuel injection timing will or may be changed appropriately according to a particular nature of the fuel(s) used. In addition, for combined use of an alcohol-containing fuel with gasoline, the gasoline—alcohol-containing fuel mixture will or may be injected directly into the combustion chamber, or may be injected while a mixing ratio of the mixture is being adjusted, or independent injectors may be equipped for the gasoline and the alcohol-containing fuel each.

During switching from SI combustion to HCCI combustion, increases in the increase rate of pressure due to continued exposure of the combustion chamber to a high-temperature atmosphere can be suppressed by applying the present invention, and consequently, combustion mode switching can be implemented with suppressed deterioration of both engine performance and silence.

What is claimed is:

1. A control apparatus used for a homogeneous charge compression-ignited internal-combustion engine including an injector for injecting a fuel into a combustion chamber, an igniter for igniting the fuel that has been injected into the combustion chamber, an air intake valve provided at an air intake side of a cylinder constituted as part of the combustion chamber, the intake valve being adapted to control operational timing of the valve itself, an exhaust valve provided at an exhaust side of the cylinder and adapted to control operational timing of the exhaust valve itself, a throttle valve adapted to control the amount of air flowing into the combustion chamber, and a swirl control valve adapted to control the flow of the air into the combustion chamber, the control apparatus controls the internal-combustion engine with a spark-ignited combustion mode in which the fuel injected from the injector is ignited and burned by the igniter in order to operate the internal-combustion engine, and a homogeneous charge compression-ignited combustion mode in which the fuel injected from the injector is burned by utilizing an internal pressure increase of the cylinder in order to operate the internal-combustion engine, the control apparatus comprising:

means for controlling the injection of the fuel from the injector, ignition by the igniter, opening and closing of the intake valve, opening and closing of the exhaust valve, opening and closing of the throttle valve, and an opening angle of the swirl control valve, the control means being adapted to switch engine operation from the spark-ignited combustion mode to the homogeneous charge compression-ignited combustion mode according to information on an operational state of the engine;

wherein, upon completion of switching from the spark-ignited combustion mode to the homogeneous charge compression-ignited combustion mode, the control means advances ignition timing of the igniter relative to ignition timing in the spark-ignited combustion mode, and for reduced maximum increase rate of pressure inside the combustion chamber, adjusts at least one of control quantities relating to the fuel injection from the injector, the ignition by the igniter, the opening and closing of the intake valve, the opening and closing of the exhaust valve, the opening and closing of the throttle valve, and the opening angle of the swirl control valve.

2. The control apparatus according to claim 1, wherein:

the control means controls at least one of the control quantities used to adjust at least one of self-ignition timing in which an air-fuel mixture present in the combustion chamber self-ignites at multiple points therein at the same time and the in-cylinder pressure starts to increase steeply, and a combustion rate after the self-ignition.

3. The control apparatus according to claim 2, wherein:

the control means includes a combustion mode switching discriminator which, in accordance with the information on the operational state of the internal-combustion engine, the discriminator selects the homogeneous charge compression-ignited combustion mode when the engine is under operating conditions that enable homogeneous charge compression-ignited combustion, and selects the spark-ignited combustion mode when the engine is under other operating conditions;

a combustion mode selector which, in accordance with discrimination results of the combustion mode switching discriminator, when the spark-ignited combustion mode is selected, the selector selects operating quantities for spark-ignited combustion and outputs the selected operating quantities as the control quantities, and when the homogeneous charge compression-ignited combustion mode is selected, the selector selects operating quantities for homogeneous charge compression-ignited combustion and outputs the selected operating quantities as the control quantities; and a combustion mode switching corrector which, immediately after the combustion mode switching discriminator has switched the selected combustion mode from spark-ignited combustion to homogeneous charge compression-ignited combustion, the corrector outputs the switching correction quantities with respect to the operating quantities for homogeneous charge compression-ignited combustion;

and wherein, immediately after the combustion mode switching discriminator has switched the selected combustion mode from spark-ignited combustion to homogeneous charge compression-ignited combustion, the switching correction quantities that the combustion mode switching corrector has output with respect to the operating quantities for homogeneous charge compression-ignited combustion are executed to adjust the operating quantities for homogeneous charge compression-ignited combustion before these operating quantities are output as the control quantities.

4. The control apparatus according to claim 3, wherein:
the combustion mode switching corrector outputs a correction quantity for reducing the quantity of main fuel injected, with respect to the operating quantity for homogeneous charge compression-ignited combustion that relates to fuel injection from the injector; and
the output correction quantity is used for reducing a combustion rate after the self-ignition.

5. The control apparatus according to claim 3, wherein:
the combustion mode switching corrector outputs a correction quantity for increasing the opening angle of the swirl control valve, with respect to the operating quantity for homogeneous charge compression-ignited combustion that relates to the swirl control valve angle; and
the output correction quantity is used for delaying the self-ignition timing.

6. The control apparatus according to claim 3, wherein:
the combustion mode switching corrector outputs a correction quantity for reducing the quantity of subsidiary fuel injected, with respect to the operating quantity for homogeneous charge compression-ignited combustion that relates to fuel injection from the injector; and
the output correction quantity is used for delaying the self-ignition timing.

7. The control apparatus according to claim 3, wherein:
the combustion mode switching corrector outputs a correction quantity for delaying injection timing of a main fuel, with respect to the operating quantity for homogeneous charge compression-ignited combustion that relates to fuel injection from the injector; and
the output correction quantity is used for delaying the self-ignition timing.

8. The control apparatus according to claim 3, wherein:
the combustion mode switching corrector outputs a correction quantity for reducing the quantity of injection of a main fuel as well as the quantity of injection of a subsidiary fuel, with respect to the operating quantity for homogeneous charge compression-ignited combustion that relates to fuel injection from the injector; and
the output correction quantity is used for delaying the self-ignition timing.

9. The control apparatus according to claim 3, wherein:
the combustion mode switching corrector outputs a correction quantity for delaying injection timing of a subsidiary fuel, with respect to the operating quantity for homogeneous charge compression-ignited combustion that relates to fuel injection from the injector; and
the output correction quantity is used for delaying the self-ignition timing.

10. The control apparatus according to claim 3 wherein:
the combustion mode switching corrector outputs a correction quantity for increasing the opening angle of the exhaust valve in an intake stroke, with respect to the operating quantity for homogeneous charge compression-ignited combustion that relates to the opening and closing of the exhaust valve; and
the output correction quantity is used for reducing the combustion rate.

11. The control apparatus according to claim 1, wherein:
the information on the operational state of the internal-combustion engine includes a sensor output signal indicating a requested torque of the engine, and a sensor output signal indicating a rotating speed of the engine.

12. A control method which is used for a homogeneous charge compression-ignited internal-combustion engine including an injector for injecting a fuel into a combustion chamber, an igniter for igniting the fuel that has been injected into the combustion chamber, an air intake valve provided at an air intake side of a cylinder constituted as part of the combustion chamber, the intake valve being adapted to control operational timing of the valve itself, an exhaust valve provided at an exhaust side of the cylinder and adapted to control operational timing of the exhaust valve itself, a throttle valve adapted to control the amount of air flowing into the combustion chamber, and a swirl control valve adapted to control the flow of the air into the combustion chamber, provides
a spark-ignited combustion mode in which the fuel injected from the injector is ignited and burned by the igniter in order to operate the internal-combustion engine, and
a homogeneous charge compression-ignited combustion mode in which the fuel injected from the injector is burned by utilizing an internal pressure increase of the cylinder in order to operate the internal-combustion engine, and
in addition to controlling the injection of the fuel from the injector, the ignition by the igniter, opening and closing of the intake valve, opening and closing of the exhaust valve, opening and closing of the throttle valve, and an opening angle of the swirl control valve, switches engine operation from the spark-ignited combustion mode to the homogeneous charge compression-ignited combustion mode according to information on an operational state of the engine, the control method comprising the steps of:
upon completion of switching from the spark-ignited combustion mode to the homogeneous charge compression-ignited combustion mode, advancing ignition timing of the igniter with respect to ignition timing in the spark-ignited combustion mode; and
for reduced maximum increase rate of pressure inside the combustion chamber, adjusting at least one of control quantities relating to the fuel injection from the injector, the ignition by the igniter, the opening and closing of the intake valve, the opening and closing of the exhaust valve, the opening and closing of the throttle valve, and the opening angle of the swirl control valve.

* * * * *